(12) United States Patent
Wu et al.

(10) Patent No.: US 11,792,787 B2
(45) Date of Patent: *Oct. 17, 2023

(54) METHOD AND DEVICE FOR WIRELESS COMMUNICATION IN UE AND BASE STATION

(71) Applicant: Honor Device Co., Ltd., Guangdong (CN)

(72) Inventors: Keying Wu, Guangdong (CN); Xiaobo Zhang, Guangdong (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/671,598

(22) Filed: Feb. 15, 2022

(65) Prior Publication Data

US 2022/0174702 A1 Jun. 2, 2022

Related U.S. Application Data

(63) Continuation of application No. 17/005,308, filed on Aug. 27, 2020, now Pat. No. 11,291,028, which is a (Continued)

(30) Foreign Application Priority Data

Mar. 6, 2018 (CN) .......................... 201810184730.X

(51) Int. Cl.
*H04W 72/1268* (2023.01)
*H04W 72/12* (2023.01)

(52) U.S. Cl.
CPC ....... *H04W 72/1268* (2013.01); *H04W 72/12* (2013.01)

(58) Field of Classification Search
None
See application file for complete search history.

(56) References Cited

U.S. PATENT DOCUMENTS 10,009,128 B2 * 6/2018 Lee ...................... H04B 17/382
10,764,886 B2 * 9/2020 Li .......................... H04W 72/04
(Continued)

FOREIGN PATENT DOCUMENTS

| CN | 105099612 A | 11/2015 |
|----|-------------|---------|
| CN | 105338568 A | 2/2016 |

(Continued)

OTHER PUBLICATIONS

ISR in application No. PCT/CN2019/076876 dated in Apr. 2, 2019.
(Continued)

*Primary Examiner* — Phirin Sam
(74) *Attorney, Agent, or Firm* — Conley Rose, P.C.

(57) ABSTRACT

The present disclosure provides a method and a device in a User Equipment (UE) and a base station used for wireless communication. The UE receives a first signaling in a first time window in a first subband; monitors a second signaling in a second time window in a second subband; if successfully receives the second signaling in the second time window in the second subband, transmits a first radio signal in a third time window in a third subband, otherwise drops transmission of the first radio signal in the third time window in the third subband. Herein, the first signaling comprises first-type scheduling information of the first radio signal. The above method allows the base station to flexibly control a transmission time of each uplink transmission on unlicensed spectrum according to specific conditions, such as the result of LBT or the direction of beamforming.

20 Claims, 18 Drawing Sheets

Related U.S. Application Data continuation of application No. PCT/CN2019/076876, filed on Mar. 4, 2019.

(56) References Cited

U.S. PATENT DOCUMENTS

| | | | |
|---|---|---|---|
| 11,291,028 B2* | 3/2022 | Wu | H04L 5/0078 |
| 2010/0034092 A1 | 2/2010 | Krishnamurthy et al. | |
| 2017/0019909 A1 | 1/2017 | Si et al. | |
| 2020/0022607 A1* | 1/2020 | Pratt | A61B 5/6891 |
| 2020/0178151 A1* | 6/2020 | Zhang | H04W 72/0446 |

FOREIGN PATENT DOCUMENTS

| | | |
|---|---|---|
| CN | 106658718 A | 5/2017 |
| CN | 107027179 A | 8/2017 |
| WO | 2013107036 A | 7/2013 |

OTHER PUBLICATIONS

Zte et al. "Discussion on NR Operation in Unlicensed Spectrum" 3GPPTSG RAN WGI Meeting #88,R1-1701619,Feb. 6, 2017(Feb. 6, 2017).

1st Office Action Received in application No. 201810184730.X dated May 13, 2020.

1st Search Report Received in application No. 201810184730.X dated May 6, 2020.

* cited by examiner

METHOD AND DEVICE FOR WIRELESS COMMUNICATION IN UE AND BASE STATION

CROSS REFERENCE TO RELATED APPLICATIONS

This application is a continuation of the U.S. patent Ser. No. 17/005,308, filed on Aug. 27, 2020, which is a continuation of International Application No. PCT/CN2019/076876, filed Mar. 4, 2019, claims the priority benefit of Chinese Patent Application No. 201810184730.X, filed on Mar. 6, 2018, the full disclosure of which is incorporated herein by reference.

BACKGROUND

Technical Field

The present disclosure relates to methods and devices in wireless communication systems, and in particular to a method and device in a wireless communication system that supports data transmissions on Unlicensed Spectrum.

Related Art

Application scenarios of future wireless communication systems are becoming increasingly diversified, and different application scenarios have different performance demands on systems. In order to meet different performance requirements of various application scenarios, a research project on access to unlicensed spectrum under New Radio (NR) was also approved at 3rd Generation Partner Project (3GPP) Radio Access Network (RAN) #75 plenary session, the research project is expected to be completed in R15 version, and WI will be started in R16 version to standardize related technologies.

In Long Term Evolution (LTE) License Assisted Access (LAA) project, a transmitter (base station or User Equipment) needs to perform Listen Before Talk (LBT) before transmitting data on unlicensed spectrum to ensure that no interface is incurred to other ongoing wireless transmissions on the unlicensed spectrum.

SUMMARY

The inventors have found through researches that in NR-Unlicensed spectrum (NR-U) system, and especially in NR-U system deployed in Stand Alone (SA) scenario, due to limitations such as Max Channel Occupy Time (MCOT), LBT and etc., transmission time of uplink data based on scheduling and uplink control information cannot always be accurately predicted by base station, which brings new problems to scheduling of uplink transmissions. Considering that beamforming based on large-scale antenna array will be widely used in NR system, channel occupation and interference conditions in different beamforming directions will be very different. Therefore, the influence of beam direction needs to be taken into consideration when LBT is performed, which makes transmission time of uplink data and uplink control information more difficult to predict.

In view of the above problem, the present disclosure provides a solution. It should be noted that the embodiments of a User Equipment (UE) in the present disclosure and the characteristics of the embodiments may be applied to a base station if no conflict is incurred, and vice versa. The embodiments of the present disclosure and the characteristics of the embodiments may be mutually combined if no conflict is incurred.

The present disclosure provides a method in a UE for wireless communication, comprising:
  receiving a first signaling in a first time window in a first subband; and
  monitoring a second signaling in a second time window in a second subband;
  if successfully receiving the second signaling in the second time window in the second subband, transmitting a first radio signal in a third time window in a third subband, otherwise, dropping transmission of the first radio signal in the third time window in the third subband;
  wherein the first signaling comprises first-type scheduling information of the first radio signal; the first signaling indicates a time interval between the third time window and the second time window; and the first signaling is associated with the second signaling.

In one embodiment, a problem needed to be solved in the present disclosure is: on unlicensed spectrum, due to limitations of MCOT, LBT and etc., it is difficult to pre-determine transmission time of uplink data based on scheduling and uplink control information. The above method solves this problem by using a trigger signaling to trigger transmissions of uplink data and uplink control information, and establishing a correlation between the trigger signaling and a scheduling signaling.

In one embodiment, the above method is characterized in that the second signaling is used for triggering transmission of the first radio signal scheduled by the first signaling, and a correlation is established between the first signaling and the second signaling.

In one embodiment, the above method is advantageous in that the base station is allowed to flexibly determine a specific transmission time of the first radio signal according to results of MCOT or LBT.

In one embodiment, the above method is advantageous in that by establishing a correlation between the first signaling and the second signaling, the base station is allowed to selectively trigger part of uplink transmissions, so that the base station can better control uplink transmission time of each UE according to specific conditions, such as the result of LBT or the direction of beamforming, etc.

In one embodiment, the above method is advantageous in that the second signaling can also be used for determining a transmitting antenna port of the first radio signal, so that the base station can select an optimal transmitting antenna port for the first radio signal according to specific conditions, such as the result of LBT or the direction of beamforming, etc.

According to one aspect of the present disclosure, wherein the first signaling indicates a time interval between the third time window and a reference time window; the first signaling comprises a first field, the first field indicating whether the reference time window is the first time window; and the first field in the first signaling indicates that the reference time window is not the first time window.

In one embodiment, the above method is advantageous in that the first field can be used for flexibly indicating whether a transmission time of the first radio signal is completely determined by its scheduling signaling or needs to wait for being triggered by a trigger signaling.

According to one aspect of the present disclosure, wherein the second signaling comprises a second field, the second field indicating whether the reference time window is the second time window; and the second field in the second signaling indicates that the reference time window is the second time window.

In one embodiment, the above method is advantageous in that the second field can be used for flexibly indicating whether to trigger transmission of the first radio signal.

According to one aspect of the present disclosure, comprising:
  receiving a second radio signal;
  wherein the first signaling comprises second-type scheduling information of the second radio signal; the first radio signal is used for determining whether the second radio signal is correctly received, or a measurement performed on the second radio signal is used for determining the first radio signal.

According to one aspect of the present disclosure, wherein the first signaling is used for determining a first antenna port group, and the second signaling is used for determining a first port group set; the first port group set comprises a positive integer number of antenna port group(s), and one antenna port group comprises a positive integer number of antenna port(s); and the first antenna port group belongs to the first port group set.

According to one aspect of the present disclosure, wherein the first signaling and the second signaling occupy a same time slice in time domain, the same time slice comprising a positive integer number of multicarrier symbol(s).

According to one aspect of the present disclosure, comprising:
  receiving a third signaling;
  wherein the third signaling indicates that a first multicarrier symbol group is occupied, the first multicarrier symbol group comprising a positive integer number of multicarrier symbol(s); the same time slice belongs to the first multicarrier symbol group.

According to one aspect of the present disclosure, wherein time-frequency resources occupied by the first signaling and time-frequency resources occupied by the second signaling belong to a same time-frequency resource pool, the same time-frequency resource pool comprising a positive integer number of Resource Elements.

According to one aspect of the present disclosure, wherein the first signaling is used for determining a first index, and the second signaling is used for determining M index(es), the first index being one of the M index(es); the M is a positive integer.

The present disclosure provides a method in a base station for wireless communication, comprising:
  transmitting a first signaling in a first time window in a first subband; and
  transmitting a second signaling in a second time window in a second subband, or dropping transmission of the second signaling in the second time window in the second subband;
  if transmitting the second signaling in the second time window in the second subband, receiving a first radio signal in a third time window in a third subband, otherwise dropping reception of the first radio signal in the third time window in the third subband.
  wherein the first signaling comprises first-type scheduling information of the first radio signal; the first signaling indicates a time interval between the third time window and the second time window; and the first signaling is associated with the second signaling.

According to one aspect of the present disclosure, wherein the first signaling indicates a time interval between the third time window and a reference time window; the first signaling comprises a first field, the first field indicating whether the reference time window is the first time window; and the first field in the first signaling indicates that the reference time window is not the first time window.

According to one aspect of the present disclosure, wherein the second signaling comprises a second field, the second field indicating whether the reference time window is the second time window; and the second field in the second signaling indicates that the reference time window is the second time window.

According to one aspect of the present disclosure, comprising:
  transmitting a second radio signal;
  wherein the first signaling comprises second-type scheduling information of the second radio signal; the first radio signal is used for determining whether the second radio signal is correctly received, or a measurement performed on the second radio signal is used for determining the first radio signal.

According to one aspect of the present disclosure, wherein the first signaling is used for determining a first antenna port group, and the second signaling is used for determining a first port group set; the first port group set comprises a positive integer number of antenna port group(s), and an antenna port group comprises a positive integer number of antenna port(s); the first antenna port group belongs to the first port group set.

According to one aspect of the present disclosure, wherein the first signaling and the second signaling occupy a same time slice in time domain, the same time slice comprising a positive integer number of multicarrier symbol(s).

According to one aspect of the present disclosure, comprising:
  transmitting a third signaling;
  wherein the third signaling indicates that a first multicarrier symbol group is occupied, the first multicarrier symbol group comprising a positive integer number of multicarrier symbol(s); and the same time slice belongs to the first multicarrier symbol group.

According to one aspect in the present disclosure, wherein time-frequency resources occupied by the first signaling and time-frequency resources occupied by the second signaling belong to a same time-frequency resource pool, the same time-frequency resource pool comprising a positive integer number of REs.

According to one aspect of the present disclosure, wherein the first signaling is used for determining a first index, and the second signaling is used for determining M index(es), the first index being one of the M index(es); the M is a positive integer.

The present disclosure provides a UE for wireless communication, comprising:
  a first receiver, receiving a first signaling in a first time window in a first subband;
  a second receiver, monitoring a second signaling in a second time window in a second subband; and
  a first processor, if successfully receiving the second signaling in the second time window in the second subband, transmitting a first radio signal in a third time window in a third subband, otherwise dropping transmission of the first radio signal in the third time window in the third subband;
  wherein the first signaling comprises first-type scheduling information of the first radio signal; the first signaling indicates a time interval between the third time window and the second time window; and the first signaling is associated with the second signaling.

In one embodiment, the above UE for wireless communication is characterized in that the first signaling indicates a time interval between the third time window and a reference time window; the first signaling comprises a first field, the first field indicating whether the reference time window is the first time window; and the first field in the first signaling indicates that the reference time window is not the first time window.

In one embodiment, the above UE for wireless communication is characterized in that the second signaling comprises a second field, the second field indicating whether the reference time window is the second time window; and the second field in the second signaling indicates that the reference time window is the second time window.

In one embodiment, the above UE for wireless communication is characterized in that the first processor also receives a second radio signal; herein, the first signaling comprises second-type scheduling information of the second radio signal; and the first radio signal is used for determining whether the second radio signal is correctly received.

In one embodiment, the above UE for wireless communication is characterized in that the first processor also receives a second radio signal; herein, the first signaling comprises second-type scheduling information of the second radio signal; and a measurement performed on the second radio signal is used for determining the first radio signal.

In one embodiment, the above UE used for wireless communication is characterized in that the first signaling is used for determining a first antenna port group, and the second signaling is used for determining a first port group set; the first port group set comprises a positive integer number of antenna port group(s), and one antenna port group comprises a positive integer number of antenna port(s); and the first antenna port group belongs to the first port group set.

In one embodiment, the above UE for wireless communication is characterized in that the first signaling and the second signaling occupy a same time slice in time domain, the same time slice comprising a positive integer number of multicarrier symbol(s).

In one embodiment, the above UE for wireless communication is characterized in that the second receiver also receives a third signaling; herein, the third signaling indicates that a first multicarrier symbol group is occupied, the first multicarrier symbol group comprising a positive integer number of multicarrier symbol(s); and the same time slice belongs to the first multicarrier symbol group.

In one embodiment, the above UE for wireless communication is characterized in that time-frequency resources occupied by the first signaling and time-frequency resources occupied by the second signaling belong to a same time-frequency resource pool, the same time-frequency-resource pool comprising a positive integer number of REs.

In one embodiment, the above UE for wireless communication is characterized in that the first signaling is used for determining a first index, and the second signaling is used for determining M index(es), the first index being one of the M index(es); the M is a positive integer.

The present disclosure provides a base station for wireless communication, comprising:
 a first transmitter, transmitting a first signaling in a first time window in a first subband;
 a second transmitter, transmitting a second signaling in a second time window in a second subband, or dropping transmission of the second signaling in the second time window in the second subband; and a second processor, if transmitting the second signaling in the second time window in the second subband, receiving a first radio signal in a third time window in a third subband, otherwise dropping reception of the first radio signal in the third time window in the third subband;
 wherein the first signaling comprises first-type scheduling information of the first radio signal; the first signaling indicates a time interval between the third time window and the second time window; and the first signaling is associated with the second signaling.

In one embodiment, the above base station for wireless communication is characterized in that the first signaling indicates a time interval between the third time window and a reference time window; the first signaling comprises a first field, the first field indicating whether the reference time window is the first time window; and the first field in the first signaling indicates that the reference time window is not the first time window.

In one embodiment, the above base station for wireless communication is characterized in that the second signaling comprises a second field, the second field indicating whether the reference time window is the second time window; and the second field in the second signaling indicates that the reference time window is the second time window.

In one embodiment, the above base station for wireless communication is characterized in that the second processor also transmits a second radio signal; herein, the first signaling comprises second-type scheduling information of the second radio signal; and the first radio signal is used for determining whether the second radio signal is correctly received.

In one embodiment, the above base station for wireless communication is characterized in that the second processor also transmits a second radio signal; herein, the first signaling comprises second-type scheduling information of the second radio signal; and a measurement performed on the second radio signal is used for determining the first radio signal.

In one embodiment, the above base station used for wireless communication is characterized in that the first signaling is used for determining a first antenna port group, and the second signaling is used for determining a first port group set; the first port group set comprises a positive integer number of antenna port group(s), and one antenna port group comprises a positive integer number of antenna port(s); and the first antenna port group belongs to the first port group set.

In one embodiment, the above base station used for wireless communication is characterized in that the first signaling and the second signaling occupy a same time slice in time domain, the same time slice comprising a positive integer number of multicarrier symbol(s).

In one embodiment, the above base station for wireless communication is characterized in that the second transmitter also transmits a third signaling; herein, the third signaling indicates that a first multicarrier symbol group is occupied, the first multicarrier symbol group comprising a positive integer number of multicarrier symbol(s); and the same time slice belongs to the first multicarrier symbol group.

In one embodiment, the above base station for wireless communication is characterized in that time-frequency resources occupied by the first signaling and time-frequency resources occupied by the second signaling belong to a same time-frequency-resource pool, the same time-frequency-resource pool comprising a positive integer number of REs.

In one embodiment, the above base station used for wireless communication is characterized in that the first signaling is used for determining a first index, the second signaling is used for determining M index(es), the first index being one of the M index(es); the M is a positive integer.

In one embodiment, the present disclosure has the following advantages over conventional schemes:

On Unlicensed Spectrum, a trigger signaling is used in addition to a scheduling signaling to trigger transmission of scheduled uplink data and uplink control information, which solves the problem that a transmission time of uplink data based on scheduling and uplink control information is difficult to be pre-determined due to the limitations of MCOT, LBT and etc.

By establishing a correlation between the scheduling signaling and the trigger signaling, the base station is allowed to selectively trigger part of uplink transmission, so that the base station can better control a transmission time of each uplink transmission according to specific conditions, such as the result of LBT, the direction of beamforming and etc.

The trigger signaling can also be used for determining a transmitting antenna port of uplink transmission, so that the base station can select an optimal transmitting antenna port for uplink transmission according to specific conditions, such as the result of LBT, the direction of beamforming and etc.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
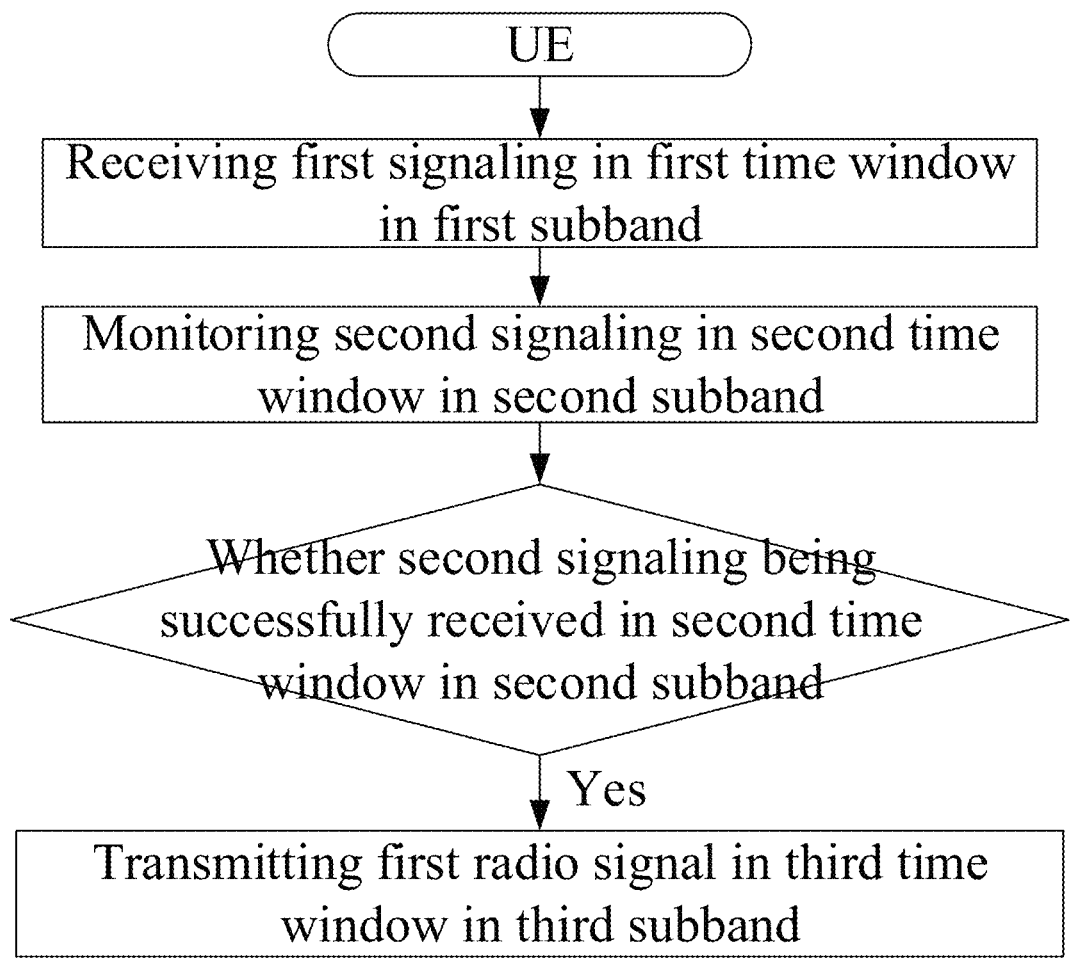
FIG. 1 illustrates a flowchart of a first signaling, a second signaling and a first radio signal according to one embodiment of the present disclosure.

Embodiment 1 illustrates a flowchart of a first signaling, a second signaling and a first radio signal, as shown in FIG. 1.

In Embodiment 1, the UE in the present disclosure receives a first signaling in a first time window in a first subband; monitors a second signaling in a second time window in a second subband; if successfully receives the second signaling in the second time window in the second subband, transmits a first radio signal in a third time window in a third subband, otherwise drops transmission of the first radio signal in the third time window in the third subband. Herein, the first signaling comprises first-type scheduling information of the first radio signal; the first signaling indicates a time interval between the third time window and the second time window; and the first signaling is associated with the second signaling.

In one embodiment, the first subband completely overlaps with the second subband.

In one embodiment, the first subband partially overlaps with the second subband.

In one embodiment, the first subband and the second subband are orthogonal to each other (not overlapping).

In one embodiment, the first subband completely overlaps with the third subband.

In one embodiment, the first subband partially overlaps with the third subband.

In one embodiment, the first subband and the third subband are orthogonal to each other (not overlapping).

In one embodiment, the second subband completely overlaps with the third subband.

In one embodiment, second first subband partially overlaps with the third subband.

In one embodiment, the second subband and the third subband are orthogonal to each other (not overlapping).

In one embodiment, the first subband, the second subband and the third subband are completely overlapping.

In one embodiment, the first subband and the third subband are associated with each other.

In one embodiment, the third subband is a band associated with the first subband for uplink transmission, and the first subband is a band associated with the third subband for downlink transmission.

In one embodiment, the second subband and the third subband are associated with each other.

In one embodiment, the third subband is a band associated with the second subband for uplink transmission, and the second subband is a band associated with the third subband for downlink transmission.

In one embodiment, the first subband is deployed on the unlicensed spectrum.

In one embodiment, the first subband is deployed on the licensed spectrum.

In one embodiment, the first subband comprises a Carrier.

In one embodiment, the first subband comprises multiple Carriers.

In one embodiment, the first subband comprises a Bandwidth Part (BWP) in a carrier.

In one embodiment, the first subband comprises multiple BWPs in a carrier.

In one embodiment, the second subband is deployed on unlicensed spectrum.

In one embodiment, the second subband is deployed on licensed spectrum.

In one embodiment, the second subband comprises a Carrier.

In one embodiment, the second subband comprises multiple Carriers.

In one embodiment, the second subband comprises a BWP in a Carrier.

In one embodiment, the second subband comprises multiple BWPs in a carrier.

In one embodiment, the third subband is deployed on unlicensed spectrum.

In one embodiment, the third subband comprises a Carrier.

In one embodiment, the third subband comprises multiple Carriers.

In one embodiment, the third subband comprises a BWP in a Carrier.

In one embodiment, the third subband comprises multiple BWPs in a carrier.

In one embodiment, the first signaling explicitly indicates the second subband.

In one embodiment, the first signaling implicitly indicates the second subband.

In one embodiment, the first signaling explicitly indicates the third subband.

In one embodiment, the first signaling implicitly indicates the third subband.

In one embodiment, the third time window is later than the second time window in time domain.

In one embodiment, the time interval between the third time window and the second time window refers to: a time interval between a start time of the third time window and an end time of the second time window.

In one embodiment, the first signaling is a physical-layer signaling.

In one embodiment, the first signaling is a dynamic signaling.

In one embodiment, the first signaling comprises Downlink Control Information (DCI).

In one embodiment, the first signaling is a dynamic signaling for Downlink Grant.

In one embodiment, the first signaling is a dynamic signaling for UpLink Grant.

In one embodiment, the first signaling group is UE-specific.

In one embodiment, a signaling identifier of the first signaling is a Cell-Radio Network Temporary Identifier (C-RNTI).

In one embodiment, the first signaling is DCI identified by a C-RNTI.

In one embodiment, a C-RNTI is used for generating an RS sequence of DeModulation Reference Signals (DMRS) corresponding to the first signaling.

In one embodiment, a Cyclic Redundancy Check of the first signaling is scrambled by a C-RNTI.

In one embodiment, the second signaling is a physical-layer signaling.

In one embodiment, the second signaling is a dynamic signaling.

In one embodiment, the second signaling is cell-common.

In one embodiment, the second signaling is terminal-group-specific, the terminal group comprising a positive integer number of terminal(s), and the UE is one terminal in the terminal group.

In one embodiment, the second signaling comprises DCI.

In one embodiment, a signaling identifier of the second signaling is a Component Carrier Radio Network Temporary Identifier (CC-RNTI).

In one embodiment, the second signaling is DCI identified by a CC-RNTI.

In one embodiment, a CC-RNTI is used for generating an RS sequence of DMRS corresponding to the second signaling.

In one embodiment, a CRC bit sequence of the second signaling is scrambled by a CC-RNTI.

In one embodiment, a signaling format of the second signaling is 1C.

In one embodiment, the second signaling is repeatedly transmitted in a positive integer number of time unit(s), the positive integer number of time unit(s) being orthogonal to each other in time domain (not overlapping).

In one subembodiment of the above embodiment, any time unit in the positive integer number of time unit(s) comprises a positive integer number of multicarrier symbol(s).

In one subembodiment of the above embodiment, the positive integer number of time unit(s) is(are) consecutive in time domain.

In one subembodiment of the above embodiment, the positive integer number of time unit(s) is(are) inconsecutive in time domain.

In one subembodiment of the above embodiment, the second signaling is transmitted by a same antenna port group in the positive integer number of time unit(s).

In one subembodiment of the above embodiment, the second signaling is transmitted by different antenna port groups in different time units among the positive integer number of time units.

In one subembodiment of the above embodiment, the UE receives the second signaling with different Spatial Rx parameters in different time units among the positive integer number of time units.

In one subembodiment of the above embodiment, the UE receives the second signaling with same Spatial Rx parameters in the positive integer number of time unit(s).

In one embodiment, if the UE successfully receives the second signaling in the second time window in the second subband, the UE transmits the first radio signal in the third time window in the third subband; if the UE does not receive the second signaling successfully in the second time window in the second subband, the UE drops transmission of the first radio signal in the third time window in the third subband.

In one embodiment, the monitoring refers to a reception based on blind detection, that is, the UE receives a signal in the second time window in the second subband and performs decoding operation, if the decoding is determined to be correct according to CRC bits, it is judged that the second signaling is successfully received in the second time window in the second subband; otherwise it is judged that the second signaling is not successfully received in the second time window in the second subband.

In one embodiment, the monitoring refers to receptions based on coherent detections, that is, the UE uses an RS sequence corresponding to DMRS of the second signaling in the second time window in the second subband to perform coherent receptions on all radio signals, and measures energy of signals obtained after the coherent receptions. If the energy of signals obtained after the coherent receptions is greater than a first given threshold, it is judged that the second signaling is successfully received in the second time window in the second subband; otherwise, it is judged that the second signaling is not successfully received in the second time window in the second subband.

In one embodiment, the monitoring refers to receptions based on energy detections, that is, the UE senses energy of all radio signals in the second time window in the second subband and averages it in time to obtain received energy. If the received energy is greater than a second given threshold, it is judged that the second signaling is successfully received in the second time window in the second subband; otherwise it is judged that the second signaling is not successfully received in the second time window in the second subband.

In one embodiment, the first radio signal comprises uplink data.

In one embodiment, the first radio signal comprises Uplink control information (UCI).

In one embodiment, the first radio signal comprises HARQ-ACK (Acknowledgement).

In one embodiment, the first radio signal comprises a Scheduling Request (SR).

In one embodiment, the first radio signal comprises a Channel-state information reference signals Resource Indicator (CRI).

In one embodiment, the first radio signal comprises Channel-State Information (CSI).

In one subembodiment of the above embodiment, the CSI comprises one or more of CRI, a Precoding Matrix Indicator (PMI), Reference Signal Received Power (RSRP), Reference Signal Received Quality (RSRQ), and a Channel Quality Indicator (CQI).

In one embodiment, first-type scheduling information of the first radio signal comprises at least one of a Modulation and Coding Scheme (MCS), configuration information of DeModulation Reference Signals (DMRS), a Hybrid Automatic Repeat reQuest (HARD) process number, a Redundancy Version (RV), a New Data Indicator (NDI), time-domain resources occupied, frequency-domain resources occupied, corresponding Spatial Tx parameters, or corresponding Spatial Rx parameters.

In one subembodiment of the above embodiment, the first radio signal comprises uplink data.

In one embodiment, first-type scheduling information of the first radio signal comprises at least one of time-domain resources occupied, frequency-domain resources occupied, code-domain resources occupied, a cyclic shift, an Orthogonal Cover Code (OCC), configuration information of DMRS, corresponding Spatial Tx parameters, corresponding Spatial Rx parameters, a PUCCH format, or UCI contents.

In one subembodiment of the above embodiment, the first radio signal comprises uplink control information.

In one embodiment, configuration information of DMRS comprises one or more of an RS sequence, a mapping mode, a DMRS type, time-domain resources occupied, frequency-domain resources occupied, code-domain resources occupied, a cyclic shift, and a Orthogonal Cover Code (OCC).

In one embodiment, the first signaling explicitly indicates a time interval between the third time window and the second time window;

In one embodiment, the first signaling implicitly indicates a time interval between the third time window and the second time window;

In one embodiment, the time interval between the third time window and the second time window is a non-negative integer number of slot(s).

In one embodiment, the time interval between the third time window and the second time window is a non-negative integer number of sub-frame(s).

In one embodiment, the time interval between the third time window and the second time window is a non-negative integer number of multicarrier symbol(s).

In one embodiment, the second signaling is used for determining a transmitting antenna port of the first radio signal.

In one embodiment, the second signaling explicitly indicates a transmitting antenna port of the first radio signal.

In one embodiment, the second signaling implicitly indicates a transmitting antenna port of the first radio signal.

In one embodiment, the first signaling indicates K antenna ports, K being a positive integer greater than 1; a transmitting antenna port of the first radio signal is one antenna port among the K antenna ports, and the second signaling is used for determining a transmitting antenna port of the first radio signal out of the K antenna ports.

In one embodiment, a transmitting antenna port of the second signaling is used for determining a transmitting antenna port of the first radio signal.

In one embodiment, time-frequency resources occupied by the second signaling is used for determining a transmitting antenna port of the first radio signal.

Embodiment 2

Figure 2:
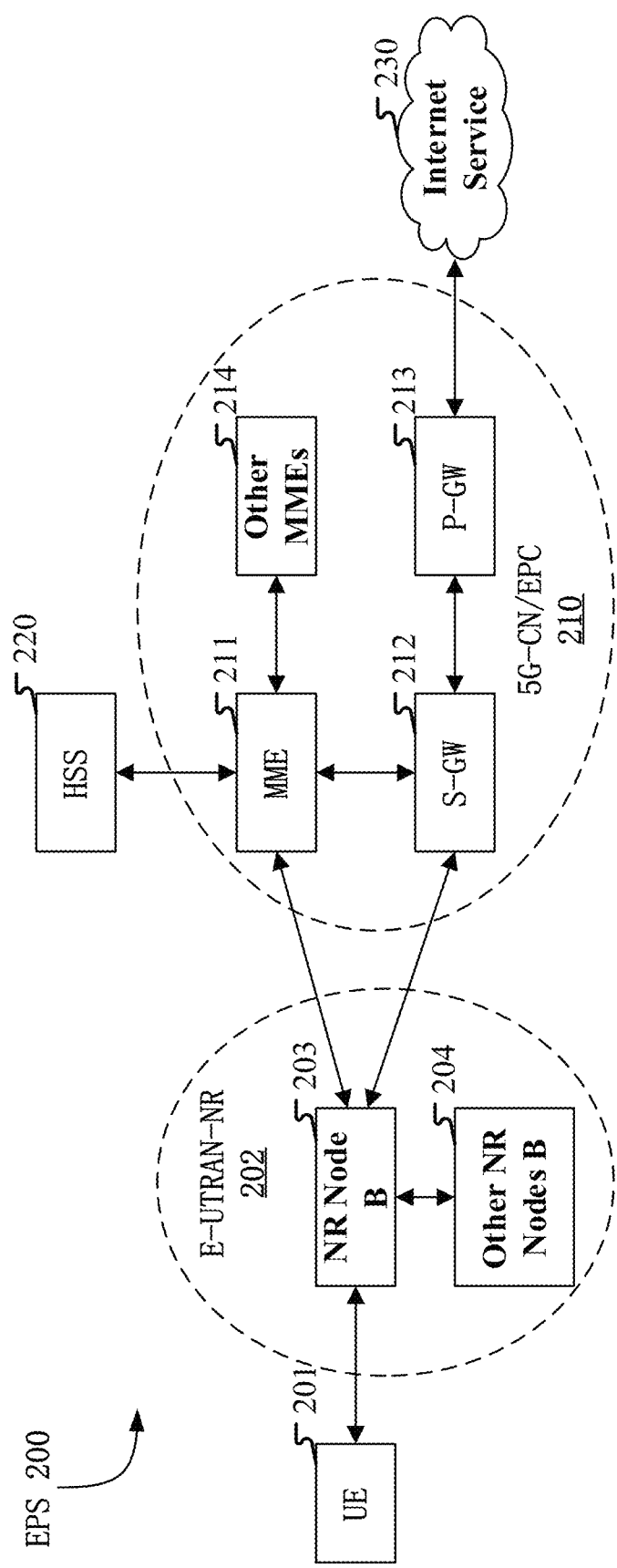
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN-NR 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), air vehicles, narrow-band physical network equipment, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises an MME 211, other MMEs 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services (PSSs).

In one embodiment, the gNB 203 corresponds to the base station in the present disclosure.

In one embodiment, the UE 201 corresponds to the UE in the present disclosure.

In one embodiment, the UE 201 supports wireless communication for data transmission on unlicensed spectrum.

In one embodiment, the gNB 203 supports wireless communication for data transmission on unlicensed spectrum.

Embodiment 3

Figure 3:
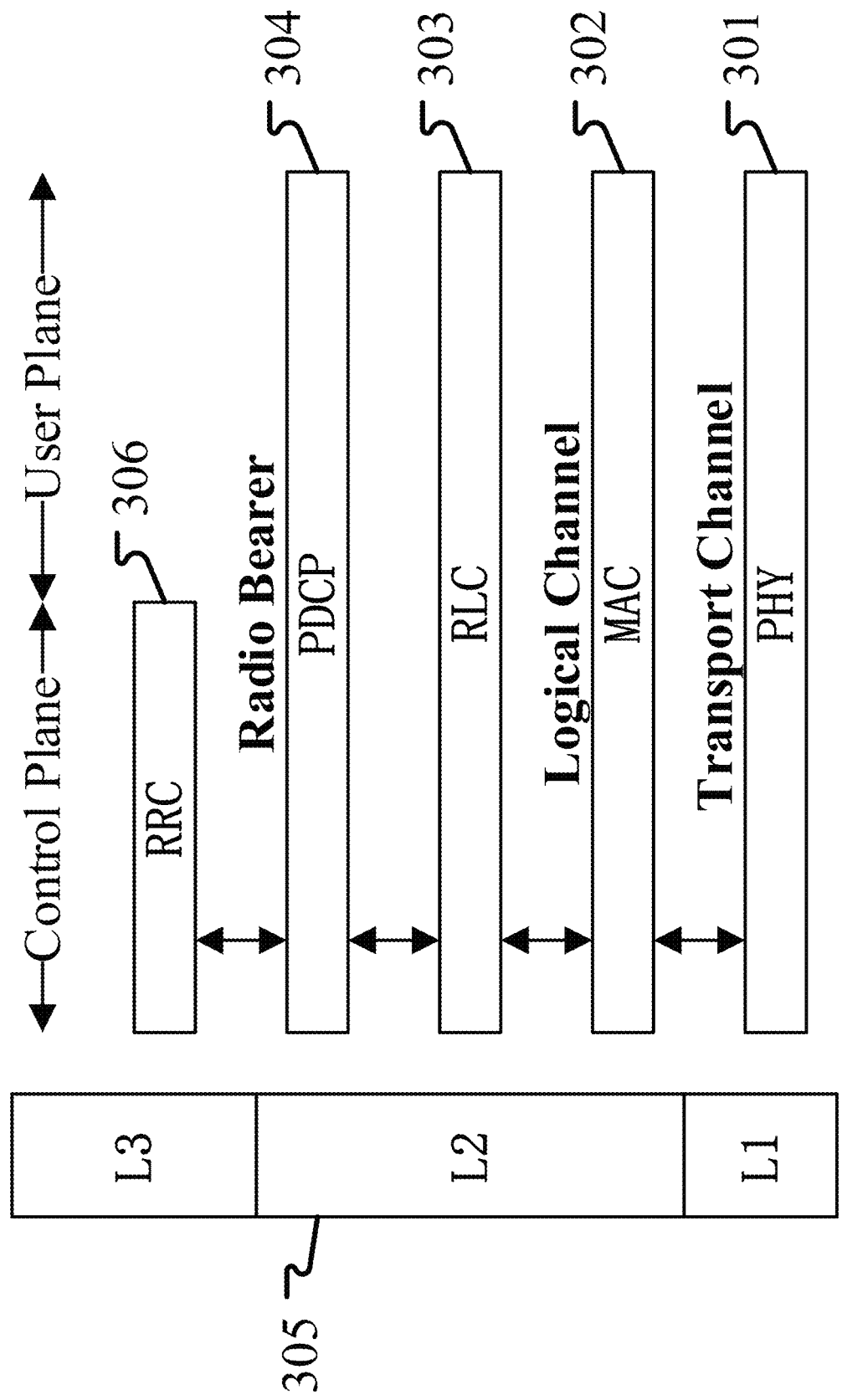
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARM). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first signaling in the present disclosure is generated by the MAC sublayer 302.

In one embodiment, the second signaling in the present disclosure is generated by the PHY 301.

In one embodiment, the second signaling in the present disclosure is generated by the MAC sublayer 302.

In one embodiment, the first radio signal in the present disclosure is generated by the PHY 301.

In one embodiment, the second radio signal in the present disclosure is generated by the PHY 301.

In one embodiment, the third signaling in the present disclosure is generated by the PHY 301.

In one embodiment, the third signaling in the present disclosure is generated by the MAC sublayer 302.

Embodiment 4

Figure 4:
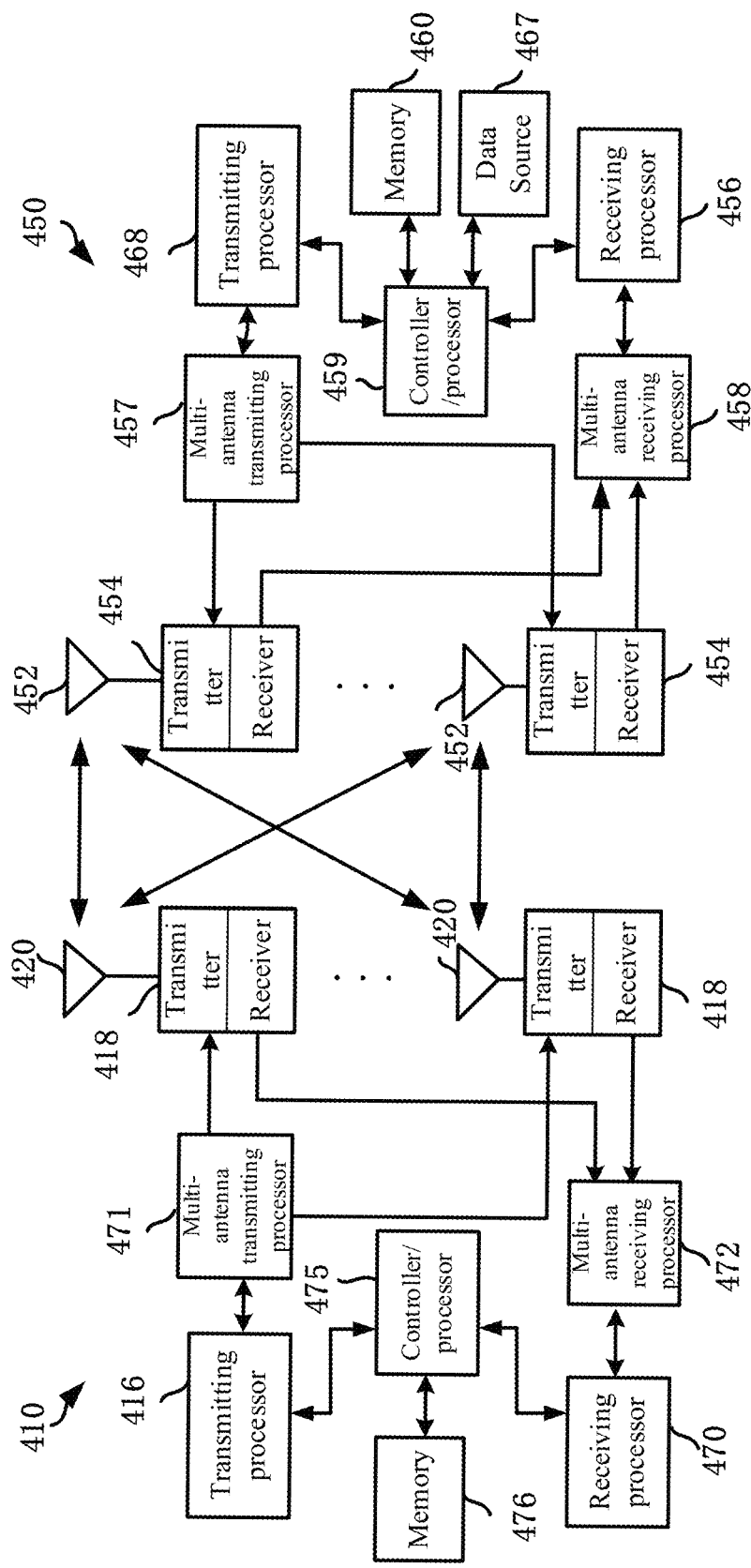
FIG. 4 illustrates a schematic diagram of a NR node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory, and the at least one memory includes computer program codes. The at least one memory and the computer program codes are configured to be used in collaboration with the at least one processor. The UE 450 at least receives the first signaling in the present disclosure in the first time window in the first subband in the present disclosure; monitors the second signaling in the second time window in the second subband in the present disclosure; if successfully receives the second signaling in the second time window in the second subband, transmits the first radio signal in the present disclosure in the third time window in the third subband in the present disclosure, otherwise drops transmission of the first radio signal in the third time window in the third subband. Herein, the first signaling comprises first-type scheduling information of the first radio signal; the first signaling indicates a time interval between the third time window and the second time window; and the first signaling is associated with the second signaling.

In one embodiment, the UE 450 comprises a memory that stores a computer readable instruction program. The computer readable instruction program generates an action when executed by at least one processor. The action includes: receiving the first signaling in the present disclosure in the first time window in the first subband in the present disclosure; monitoring the second signaling in the second time window in the second subband in the present disclosure; if successfully receiving the second signaling in the second time window in the second subband, transmitting the first radio signal in the present disclosure in the third time window in the third subband in the present disclosure, otherwise dropping transmission of the first radio signal in the third time window in the third subband. Herein, the first signaling comprises first-type scheduling information of the first radio signal; the first signaling indicates a time interval between the third time window and the second time window; and the first signaling is associated with the second signaling.

In one embodiment, the gNB 410 comprises at least one processor and at least one memory, and the at least one memory includes computer program codes. The at least one memory and the computer program codes are configured to be used in collaboration with the at least one processor. The gNB 410 at least: transmits the first signaling in the present disclosure in the first time window in the first subband in the present disclosure; transmits the second signaling in the present disclosure in the second time window in the second subband in the present disclosure, or drops transmission of the second signaling in the second time window in the second subband; if transmits the second signaling in the second time window in the second subband, receives the first radio signal in the present disclosure in the third time window in the third subband in the present disclosure, otherwise drops reception of the first radio signal in the third time window in the third subband. Herein, the first signaling comprises first-type scheduling information of the first radio signal; the first signaling indicates a time interval between the third time window and the second time window; and the first signaling is associated with the second signaling.

In one embodiment, the gNB 410 comprises a memory that stores a computer readable instruction program. The computer readable instruction program generates an action when executed by at least one processor. The action includes: transmitting the first signaling in the present disclosure in the first time window in the first subband in the present disclosure; transmitting the second signaling in the present disclosure in the second time window in the second subband in the present disclosure, or dropping transmission of the second signaling in the second time window in the second subband; if transmitting the second signaling in the second time window in the second subband, receiving the first radio signal in the present disclosure in the third time window in the third subband in the present disclosure, otherwise dropping reception of the first radio signal in the third time window in the third subband. Herein, the first signaling comprises first-type scheduling information of the first radio signal; the first signaling indicates a time interval between the third time window and the second time window; and the first signaling is associated with the second signaling.

In one embodiment, the gNB 410 corresponds to the base station in the present disclosure.

In one embodiment, the UE 450 corresponds to the UE in the present disclosure.

In one embodiment, at least one of the antenna 452, the receiver 454, the receiving processor 456, the multi-antenna receiving processor 458, the controller/processor 459, the memory 460, or the data source 467 is used for receiving the first signaling in the present disclosure in the first time window in the first subband in the present disclosure; at least one of the antenna 420, the transmitter 418, the transmitting processor 416, the multi-antenna transmitting processor 471, the controller/processor 475, or the memory 476 is used for transmitting the first signaling in the present disclosure in the first time window in the first subband.

In one embodiment, at least one of the antenna 452, the receiver 454, the receiving processor 456, the multi-antenna receiving processor 458, the controller/processor 459, the memory 460, or the data source 467 is used for monitoring the second signaling in the present disclosure in the second time window in the second subband in the present disclosure; at least one of the antenna 420, the transmitter 418, the transmitting processor 416, the multi-antenna transmitting processor 471, the controller/processor 475, or the memory 476 is used for transmitting the second signaling in the present disclosure in the second time window in the second subband.

In one embodiment, at least one of the antenna 452, the receiver 454, the receiving processor 456, the multi-antenna receiving processor 458, the controller/processor 459, the memory 460, or the data source 467 is used for determining whether the second signaling in the present disclosure is successfully received in the second time window in the second subband in the present disclosure.

In one embodiment, at least one of the antenna 420, the receiver 418, the receiving processor 470, the multi-antenna receiving processor 472, the controller/processor 475, or the memory 476 is used for receiving the first radio signal in the present disclosure in the third time window in the third subband in the present disclosure; at least one of the antenna 452, the transmitter 454, the transmitting processor 468, the multi-antenna transmitting processor 457, the controller/processor 459, the memory 460, or the data source 467 is used for transmitting the first radio signal in the third time window in the third subband in the present disclosure.

In one embodiment, at least one of the antenna 452, the receiver 454, the receiving processor 456, the multi-antenna receiving processor 458, the controller/processor 459, the memory 460, or the data source 467 is used for receiving the second radio signal in the present disclosure; at least one of the antenna 420, the transmitter 418, the transmitting processor 416, the multi-antenna transmitting processor 471, the controller/processor 475, or the memory 476 is used for transmitting the second radio signal in the present disclosure.

In one embodiment, at least one of the antenna 452, the receiver 454, the receiving processor 456, the multi-antenna receiving processor 458, the controller/processor 459, the memory 460, or the data source 467 is used for receiving the third signaling in the present disclosure. at least one of the antenna 420, the transmitter 418, the transmitting processor 416, the multi-antenna transmitting processor 471, the controller/processor 475, or the memory 476 is used for transmitting the third signaling in the present disclosure.

Embodiment 5

Figure 5:
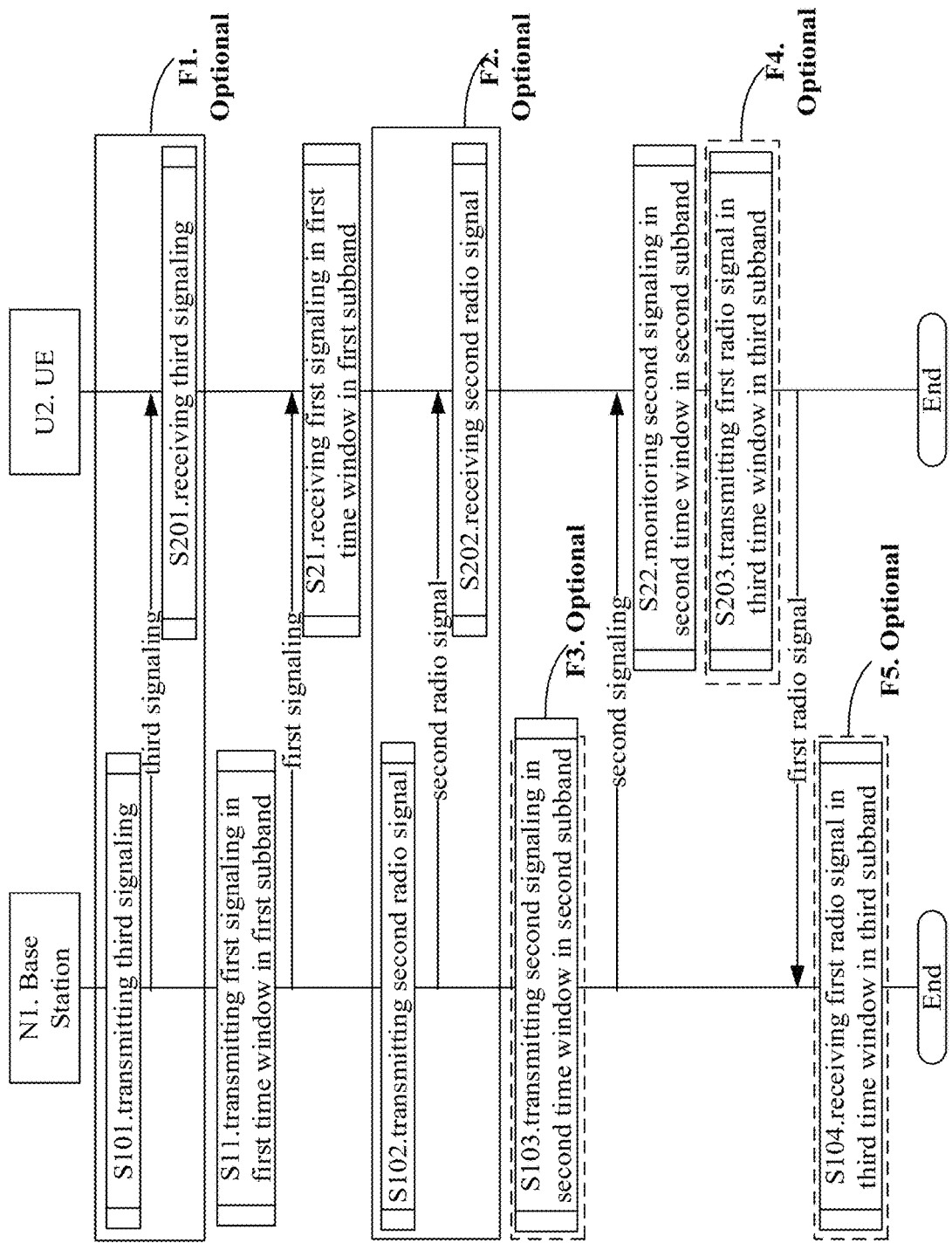
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is a maintenance base station for a serving cell of a UE U2. In FIG. 5, each step in block F1 to block F5 is optional.

The N1 transmits a third signaling in step S101; transmits a first signaling in a first time window in a first subband in step S11; transmits a second radio signal in step S102; transmits a second signaling in a second time window in a second subband in step S103; and receives a first radio signal in a third time window in a third subband in step S104.

The U2 receives a third signaling in step S201; receives a first signaling in a first time window in a first subband in step S21; receives a second radio signal in step S202; monitors a second signaling in a second time window in a second subband in step S22; and transmits a first radio signal in a third time window in a third subband in step S203.

In Embodiment 5, if the U2 successfully receives the second signaling in the second time window in the second subband, the U2 transmits the first radio signal in the third window in the third subband; otherwise the U2 drops transmission of the first radio signal in the third time window in the third subband. If the N1 transmits the second signaling in the second time window in the second subband, the N1 receives the first radio signal in the third time window in the third subband, otherwise the N1 drops reception of the first radio signal in the third time window in the third subband. The first signaling comprises first-type scheduling information of the first radio signal; the first signaling indicates a time interval between the third time window and the second time window; the first signaling is associated with the second signaling. The first signaling comprises second-type scheduling information of the second radio signal; the first radio signal is used by the N1 for determining whether the second radio signal is correctly received, or a measurement performed on the second radio signal is used by the U2 for determining the first radio signal.

In one embodiment, if the U2 successfully receives the second signaling in the second time window in the second subband, the box F4 in FIG. 5 exists; if the U2 does not successfully receive the second signaling in the second time window in the second subband, the box F4 in FIG. 5 does not exist.

In one embodiment, if the box F3 in FIG. 5 exists, the box F5 in FIG. 5 also exists; if the box F3 in FIG. 5 does not exist, neither does the box F5 in FIG. 5.

In one embodiment, the box F3 and the box F5 in FIG. 5 exist or do not exist at the same time.

In one embodiment, the first radio signal is used by the N1 for determining whether the second radio signal is correctly received.

In one embodiment, a measurement performed on the second radio signal is used by the U2 for determining the first radio signal.

In one embodiment, a measurement performed on the second radio signal is used by the U2 for determining UCI carried by the first radio signal.

In one embodiment, the first signaling indicates a time interval between the third time window and a reference time window; the first signaling comprises a first field, the first field indicating whether the reference time window is the first time window; and the first field in the first signaling indicates that the reference time window is not the first time window.

In one embodiment, the second signaling comprises a second field, the second field indicating whether the reference time window is the second time window; and the second field in the second signaling indicates that the reference time window is the second time window.

In one embodiment, second-type scheduling information of the second radio signal comprises at least one of a Modulation and Coding Scheme (MCS), configuration information of DMRS, a HARQ process number, an RV, an NDI, time-domain resources occupied, frequency-domain resources occupied, corresponding Spatial Tx parameters, or corresponding Spatial Rx parameters.

In one subembodiment of the above embodiment, the second radio signal comprises downlink data.

In one embodiment, second-type scheduling information of the second radio signal comprises at least one of time-domain resources occupied, frequency-domain resources occupied, code-domain resources occupied, an RS sequence, a cyclic shift, an Orthogonal Cover Code (OCC), corresponding Spatial Tx parameters, or corresponding Spatial Rx parameters.

In one subembodiment of the above embodiment, the second radio signal comprises a downlink reference signal.

In one embodiment, the second radio signal is transmitted in the first subband.

In one embodiment, the second radio signal is transmitted in the second subband.

In one embodiment, the second radio signal is transmitted in the third subband.

In one embodiment, the second radio signal is transmitted on a subband other than the first subband, the second subband and the third subband.

In one embodiment, the second radio signal is transmitted on a subband deployed on unlicensed spectrum.

In one embodiment, the second radio signal is transmitted on a subband deployed on licensed spectrum.

In one embodiment, the first signaling is used by the U2 for determining a first antenna port group, and the second signaling is used by the U2 for determining a first port group set; the first port group set comprises a positive integer number of antenna port group(s), and one antenna port group comprises a positive integer number of antenna port(s); and the first antenna port group belongs to the first port group set.

In one embodiment, the phrase that the first signaling and the second signaling are associated with each other refers to: the first antenna port group belongs to the first port group set.

In one embodiment, the first signaling and the second signaling occupy a same time slice in time domain, the same time slice comprising a positive integer number of multi-carrier symbol(s).

In one embodiment, the phrase that the first signaling and the second signaling are associated with each other refers to: the first signaling and the second signaling occupy a same time slice in time domain.

In one embodiment, the third signaling indicates that a first multicarrier symbol group is occupied, the first multi-carrier symbol group comprising a positive integer number of multicarrier symbol(s); the same time slice belongs to the first multicarrier symbol group.

In one embodiment, the third signaling is a physical-layer signaling.

In one embodiment, the third signaling is a dynamic signaling.

In one embodiment, the third signaling is cell-common.

In one embodiment, the third signaling is terminal-group-specific, the terminal group comprising a positive integer number of terminal(s), and the U2 is one terminal in the terminal group.

In one embodiment, the third signaling comprises DCI.

In one embodiment, a signaling identifier of the third signaling is a C-RNTI.

In one embodiment, the third signaling is DCI identified by a CC-RNTI.

In one embodiment, a CC-RNTI is used for generating an RS sequence of DMRS corresponding to the third signaling.

In one embodiment, a CRC bit sequence of the third signaling is scrambled by a CC-RNTI.

In one embodiment, a signaling format of the third signaling is 1C.

In one embodiment, the third signaling is transmitted in the first subband.

In one embodiment, the third signaling is transmitted in the second subband.

In one embodiment, the third signaling is transmitted in the third subband.

In one embodiment, the third signaling is transmitted on a subband other than the first subband, the second subband and the third subband.

In one embodiment, the third signaling is transmitted on a subband deployed on unlicensed spectrum.

In one embodiment, the third signaling is transmitted on a subband deployed on licensed spectrum.

In one embodiment, time-frequency resources occupied by the first signaling and time-frequency resources occupied by the second signaling belong to a same time-frequency resource pool, the same time-frequency resource pool comprising a positive integer number of REs.

In one embodiment, the phrase that the first signaling and the second signaling are associated with each other refers to: time-frequency resources occupied by the first signaling and time-frequency resources occupied by the second signaling belong to a same time-frequency resource pool.

In one embodiment, the first signaling is used by the U2 for determining a first index, and the second signaling is used by the U2 for determining M index(es), the first index being one index among the M index(es); the M is a positive integer.

In one embodiment, the phrase that the first signaling and the second signaling are associated with each other refers to: the first index is one index among the M index(es).

In one embodiment, the first signaling is transmitted on a downlink physical-layer control channel (i.e., a downlink channel that can only be used for bearing a physical-layer signaling).

In one subembodiment of the above embodiment, the downlink physical layer control channel is a Physical Downlink Control CHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a Narrow Band PDCCH (NB-PDCCH).

In one embodiment, the second signaling is transmitted on a downlink physical layer control channel (i.e., a downlink channel that can only be used for bearing physical-layer signaling).

In one subembodiment of the above embodiment, the downlink physical-layer control channel is a PDCCH.

In one subembodiment of the above embodiment, the downlink physical-layer control channel is an sPDCCH.

In one subembodiment of the above embodiment, the downlink physical-layer control channel is an NR-PDCCH.

In one subembodiment of the above embodiment, the downlink physical-layer control channel is an NB-PDCCH.

In one embodiment, the first radio signal is transmitted on an uplink physical-layer data channel (i.e., an uplink channel that can be used for bearing physical-layer data).

In one subembodiment of the above embodiment, the uplink physical-layer data channel is a Physical Uplink Shared CHannel (PUSCH).

In one subembodiment, the uplink physical-layer data channel is a short Physical Uplink Shared Channel (sPUSCH).

In one subembodiment of the above embodiment, the uplink physical-layer data channel is a New Radio PUSCH (NR-PUSCH).

In one subembodiment of the above embodiment, the uplink physical-layer data channel is a Narrow Band PUSCH (NB-PUSCH).

In one embodiment, a transmission channel corresponding to the first radio signal is an Uplink Shared Channel (UL-SCH).

In one embodiment, the first radio signal is transmitted on an uplink physical-layer control channel (that is, an uplink channel that can only be used for bearing a physical-layer signaling).

In one subembodiment of the above embodiment, the uplink physical-layer control channel is a Physical Uplink Control CHannel (PUCCH).

In one subembodiment of the above embodiment, the uplink physical-layer control channel is a short PUCCH (sPUCCH).

In one subembodiment of the above embodiment, the uplink physical-layer control channel is a New Radio PUCCH (NR-PUCCH).

In one subembodiment of the above embodiment, the uplink physical-layer control channel is a Narrow Band PUCCH (NB-PUCCH).

In one embodiment, the second radio signal is transmitted on a downlink physical layer data channel (i.e., a downlink channel that can be used for bearing physical layer data).

In one subembodiment of the above embodiment, the downlink physical-layer data channel is a Physical Downlink Shared CHannel (PDSCH).

In one subembodiment of the above embodiment, the downlink physical-layer data channel is a short PDSCH (sPDSCH).

In one subembodiment of the above embodiment, the downlink physical-layer data channel is a New Radio PDSCH (NR-PDSCH).

In one subembodiment of the above embodiment, the downlink physical-layer data channel is a Narrow Band PDSCH (NB-PDSCH).

In one embodiment, the third signaling is transmitted on a downlink physical-layer control channel (i.e., a downlink channel that can only be used for bearing a physical layer signaling).

In one subembodiment of the above embodiment, the downlink physical-layer control channel is a PDCCH.

In one subembodiment of the above embodiment, the downlink physical-layer control channel is an sPDCCH.

In one subembodiment of the above embodiment, the downlink physical-layer control channel is an NR-PDCCH.

In one subembodiment of the above embodiment, the downlink physical-layer control channel is an NB-PDCCH.

Embodiment 6

Figure 6:
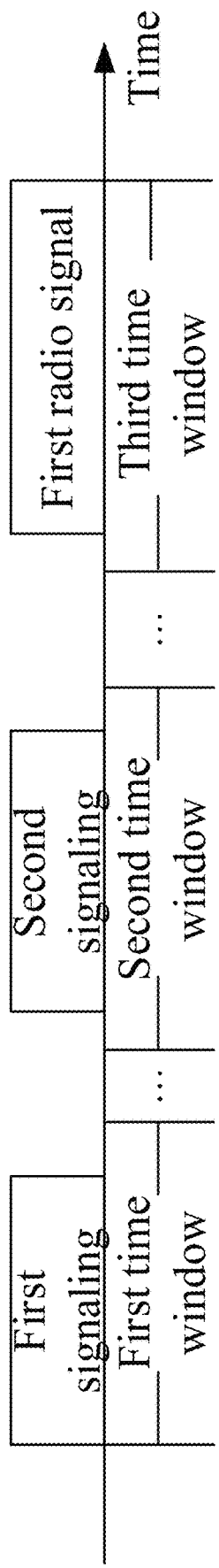
FIG. 6 illustrates a schematic diagram of sequential relationships among a first signaling, a second signaling and a first radio signal in time domain.

Embodiment 6 illustrates a schematic diagram of sequential relationships among a first signaling, a second signaling and a first radio signal in time domain, as shown in FIG. 6.

In Embodiment 6, the UE in the present disclosure receives the first signaling in the first time window in the present disclosure, receives the second signaling in the second time window in the present disclosure, and transmits the first radio signal in the third time window in the present disclosure. A start time of the second time window is not earlier than an end time of the first time window, and a start time of the third time window is not earlier than an end time of the second time window.

In one embodiment, the first time window comprises a positive integer number of multicarrier symbol(s) in time domain.

In one embodiment, the first time window comprises a positive integer number of consecutive multicarrier symbols in time domain.

In one embodiment, the first time window consists of 14 consecutive multicarrier symbols.

In one embodiment, the first time window is a slot.

In one embodiment, the first time window is a slot occupied by the first signaling.

In one embodiment, the first time window is a subframe.

In one embodiment, the first time window is a subframe occupied by the first signaling.

In one embodiment, the first signaling does not occupy a latest multicarrier symbol in the first time window.

In one embodiment, the second time window comprises a positive integer number of multicarrier symbol(s) in time domain.

In one embodiment, the second time window comprises a positive integer number of consecutive multicarrier symbols in time domain.

In one embodiment, the second time window consists of 14 consecutive multicarrier symbols.

In one embodiment, the second time window is a slot.

In one embodiment, the second time window is a slot occupied by the second signaling.

In one embodiment, the second time window is a subframe.

In one embodiment, the second time window is a subframe occupied by the second signaling.

In one embodiment, the second signaling does not occupy a latest multicarrier symbol in the second time window.

In one embodiment, the third time window comprises a positive integer number of multicarrier symbol(s) in time domain.

In one embodiment, the third time window comprises a positive integer number of consecutive multicarrier symbols in time domain.

In one embodiment, the third time window consists of 14 consecutive multicarrier symbols.

In one embodiment, the third time window is a slot.

In one embodiment, the third time window is a slot occupied by the first radio signal.

In one embodiment, the third time window is a subframe.

In one embodiment, the third time window is a subframe occupied by the first radio signal.

In one embodiment, the first radio signal does not occupy an earliest multicarrier symbol in the third time window.

In one embodiment, a start time of the second time window is not earlier than an end time of the first time window.

In on embodiment, a time interval between the first time window and the second time window is less than a first threshold, and the first signaling is used for determining the first threshold.

In one subembodiment of the above embodiment, the first threshold is measured by slot.

In one subembodiment of the above embodiment, the first threshold is measured by subframe.

In one subembodiment of the above embodiment, the first threshold is a non-negative integer.

In one embodiment, a start time of the third time window is not earlier than an end time of the second time window.

In one embodiment, the first signaling indicates a time interval between the third time window and the second time window.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

Embodiment 7

Figure 7:
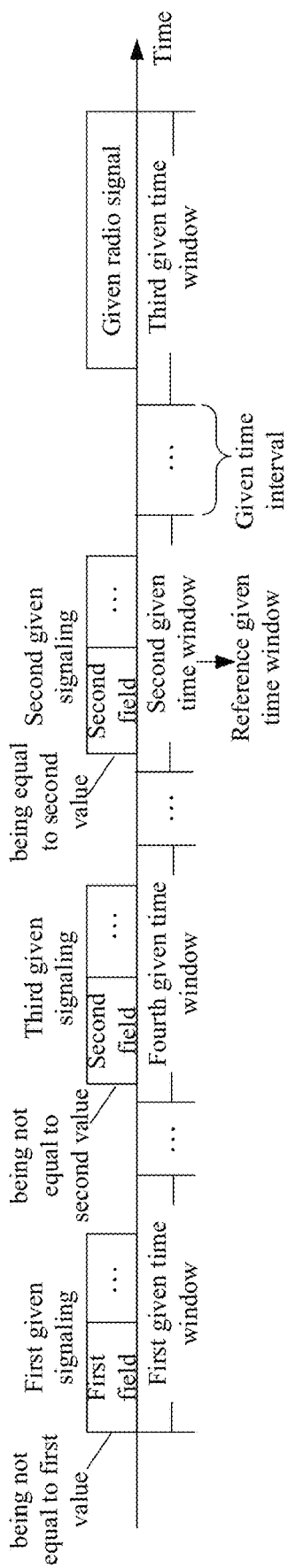
FIG. 7 illustrates a schematic diagram of a first field and a second field according to one embodiment of the present disclosure.

Embodiment 7 illustrates a schematic diagram of a first field and a second field, as shown in FIG. 7.

In Embodiment 7, a first given signaling comprises the first field, and a second given signaling comprises the second field, the second given signaling and the first given signaling being associated. The first given signaling comprises scheduling information of a given radio signal, and the first given signaling indicates a given offset, the given offset being a time interval between a third given time window and a reference given time window. The reference given time window is a first given time window or a second given time window. The first field in the first given signaling is used for determining whether the reference given time window is the first given time window; when the first field in the first given signaling is used for determining that the reference given time window is not the first given time window, and the second field in the second given signaling is used for determining whether the reference given time window is the second given time window. Time-resources occupied by the first given signaling, the second given signaling and the given radio signal respectively belong to the first given time window, the second given time window and the third given time window.

If the first field in the first given signaling is equal to a first value, the reference given time window is the first given time window; if the first field in the first given signaling is not equal to the first value, the reference given time window is not the first given time window. In the case of the first field in the first given signaling is not equal to the first value, if the second field in the second given signaling is equal to a second value, the reference given time window is the second given time window; if the second field in the second given signaling is not equal to the second value, the reference given time window is not the second given time window.

In Embodiment 7, the first field in the first given signaling is not equal to the first value, the second field in the second given signaling is equal to the second value, the reference given time window is the second given time window, and the given offset is a time interval between the third given time window and the second given time window.

In one embodiment, the first value is a non-negative integer.

In one embodiment, the first value is equal to 0.

In one embodiment, the first value is equal to 1.

In one embodiment, if the first field is equal to the first value, the reference time window in the present disclosure is the first time window in the present disclosure; otherwise the reference time window is not the first time window.

In one embodiment, the first field in the first signaling in the present disclosure is not equal to the first value.

In one embodiment, the first field in the first signaling in the present disclosure is used for determining that the reference time window in the present disclosure is not the first time window in the present disclosure.

In one embodiment, the second value is a non-negative integer.

In one embodiment, the second value is equal to 1.

In one embodiment, the second value is equal to 0.

In one embodiment, if the second field is equal to the second value, the reference time window in the present disclosure is the second time window in the present disclosure; otherwise the reference time window is not the second time window.

In one embodiment, the second field in the second signaling in the present disclosure is equal to the second value.

In one embodiment, the second field in the second signaling in the present disclosure is used for determining that the reference time window in the present disclosure is the second time window in the present disclosure.

In one embodiment, the given offset is a non-negative integer.

In one embodiment, the given offset is measured by slot.

In one embodiment, the given offset is measured by subframe.

In one embodiment, the given offset is measured by ms.

In one embodiment, the given offset is measured by multicarrier symbol.

In one embodiment, the first given time window is a slot.

In one embodiment, the first given time window is a slot occupied by the first given signaling.

In one embodiment, the first given time window is a subframe.

In one embodiment, the first given time window is a subframe occupied by the first given signaling.

In one embodiment, the second given time window is a slot.

In one embodiment, the second given time window is a slot occupied by the second given signaling.

In one embodiment, the second given time window is a subframe.

In one embodiment, the second given time window is a subframe occupied by the second given signaling.

In one embodiment, the third given time window is a slot.

In one embodiment, the third given time window is a slot occupied by the given radio signal.

In one embodiment, the third given time window is a subframe.

In one embodiment, the third given time window is a subframe occupied by the given radio signal.

In one embodiment, the given radio signal is transmitted on a subband deployed on unlicensed spectrum.

In one embodiment, the given radio signal comprises uplink data.

In one embodiment, the given radio signal comprises UCI.

In one embodiment, the first given signaling is a dynamic signaling for Downlink Grant.

In one embodiment, the first given signaling is a dynamic signaling for UpLink Grant.

In one embodiment, the first given signaling group is UE-specific.

In one embodiment, the second signaling is cell-common.

In one embodiment, the second given signaling is terminal-group-specific, and a transmitter of the given radio signal is one terminal in the given terminal group.

In one embodiment, a signaling identifier for the second given signaling is a CC-RNTI.

In one embodiment, a third given signaling and the first given signaling are associated, time-frequency resources occupied by the third given signaling belong to a fourth given time window, the third given signaling comprises the second field, and the second field in the third given signaling is not equal to the second value. A position of the third given time window in time domain is independent of the fourth time window.

In one embodiment, the third given signaling is cell-common.

In one embodiment, the third given signaling is terminal-group-specific.

In one embodiment, a signaling identifier for the third given signaling is a CC-RNTI.

In one embodiment, a transmitter of the given radio signal does not receive a signaling, which is associated with the first given signaling and comprises the second field that is equal to the second value, between the first given time window and the second given time window.

In one embodiment, the UE in the present disclosure does not receive a signaling, which is associated with the first signaling in the present disclosure and comprises the second field that is equal to the second value, between the first time window in the present disclosure and the second time window in the present disclosure.

In one embodiment, an index of the second given time window in time domain is n, an index of the first given time window in time domain is n−p, and an index of the third given time window in time domain is n+k; wherein the n is a non-negative integer, the k is the given offset, the p is a positive integer not greater than a first threshold, and the first given signaling indicates the first threshold.

In one subembodiment of the above embodiment, the first threshold is a positive integer.

In one subembodiment of the above embodiment, the first threshold is measured by slot.

In one subembodiment of the above embodiment, the first threshold is measured by subframe.

In one subembodiment of the above embodiment, the first threshold is measured by ms.

In one subembodiment of the above embodiment, the first threshold is measured by multicarrier symbol.

Embodiment 8

Figure 8:
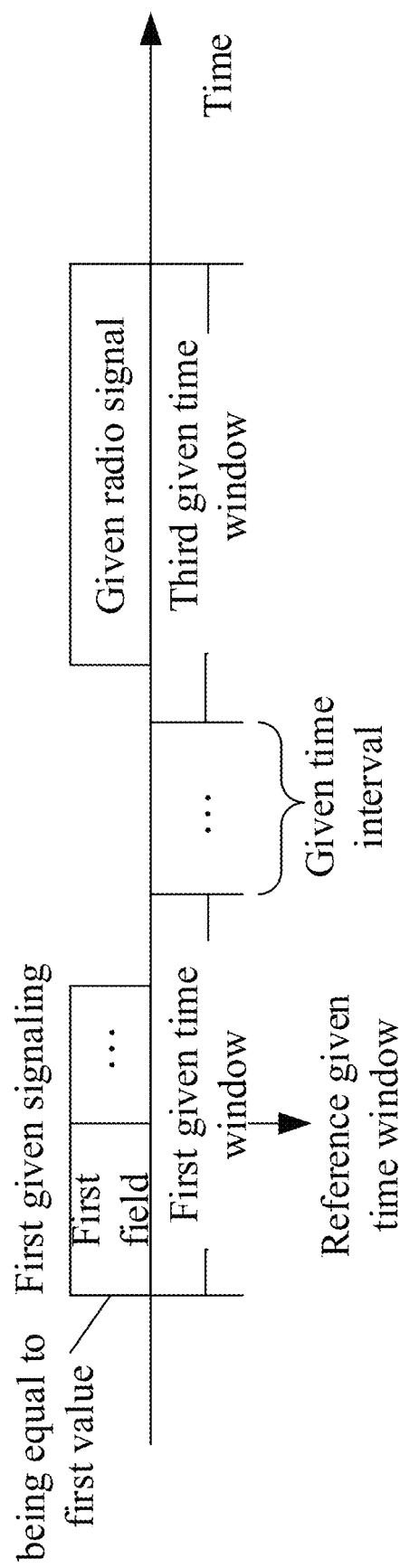
FIG. 8 illustrates a schematic diagram of a first field according to one embodiment of the present disclosure.

Embodiment 8 illustrates a schematic diagram of a first field, as shown in FIG. 8.

In Embodiment 8, a first given signaling comprises the first field, the first given signaling comprises scheduling information of a given radio signal, and the first given signaling indicates a given offset, the given offset being a time interval between a third given time window and a reference given time window. The first field in the first given signaling is used for determining whether the reference given time window is the first given time window. Time resources occupied by the first given signaling and the given radio signal respectively belong to the first given time window and the third given time window.

If the first field in the first given signaling is equal to a first value, the reference given time window is the first given time window; if the first field in the first given signaling is not equal to the first value, the reference given time window is not the first given time window.

In Embodiment 8, the first field in the first given signaling is equal to the first value, the reference given time window is the first given time window, and the given offset is a time interval between the third given time window and the first given time window.

In one embodiment, an index of the first given time window in time domain is n, and an index of the third given time window in time domain is n+k; wherein the n is a non-negative integer, and the k is the given offset.

Embodiment 9

Figure 9:
FIG. 9 illustrates a schematic diagram of a first signaling according to one embodiment of the present disclosure.

Embodiment 9 illustrates a schematic diagram of a first signaling, as shown in FIG. 9.

In Embodiment 9, the first signaling comprises scheduling information of the first radio signal in the present disclosure. Time resources occupied by the first signaling and the first radio signal respectively belong to the first time window and the third time window. The first signaling comprises the first field and the third field in the present disclosure. The third field in the first signaling indicates a time interval between the third time window and a reference time window, the first field indicates whether the reference time window is the first time window, and the first field in the first signaling indicates that the reference time window is not the first time window.

In one embodiment, the first field is a PUSCH trigger A field, and the specific definition of the PUSCH trigger A can be found in 3GPP TS36.212, chapter 5.3.3 and 3GPP TS36.213, chapter 8.

In one embodiment, the first field consists of 1 bit.

In one embodiment, the first field consists of 2 bits.

In one embodiment, the third field in the first signaling indicates the third time window.

In one embodiment, the third field in the first signaling indicates a time interval between the third time window and the second time window in the present disclosure.

In one embodiment, the time interval between the third time window and a reference time window refers to: a time interval between a start time of the third time window and an end time of the reference time window.

In one embodiment, the third field consists of 1 bit.

In one embodiment, the third field consists of 2 bits.

In one embodiment, the third field consists of 3 bits.

In one embodiment, the third field consists of 4 bits.

In one embodiment, the third field is a Timing offset field, and the specific definition of the Timing offset can be found in 3GPP TS36.212, chapter 5.3.3 and 3GPP TS36.213, chapter 8.

In one subembodiment of the above embodiment, the first radio signal comprises uplink data.

In one subembodiment of the above embodiment, the first radio signal is transmitted on an uplink physical layer data channel (i.e., an uplink channel can be used for bearing physical layer data).

In one subembodiment of the above embodiment, the first signaling is a dynamic signaling used for uplink grant.

In one embodiment, first S bit(s) in the third field indicates(s) a time interval between the third time window and the reference time window, the S being a positive integer.

In one subembodiment of the above embodiment, the S is equal to 2.

In one embodiment, the third field is a Time-domain resource assignment field, and the specific definition of the Time-domain resource assignment field can be found in 3GPP TS38.212, chapter 7.3 and 3GPP TS38.214, chapter 5.1.

In one subembodiment of the above embodiment, the first radio signal comprises uplink data.

In one subembodiment of the above embodiment, the first radio signal is transmitted on an uplink physical-layer data channel (i.e., an uplink channel can be used for carrying physical layer data).

In one subembodiment of the above embodiment, the first signaling is a dynamic signaling used for uplink grant.

In one embodiment, the third field is a PDSCH-to-HARQ feedback timing indicator field, and the specific definition of the PDSCH-to-HARQ feedback timing indicator can be found in 3GPP TS38.212, chapter 7.3 and 3GPP TS38.213, chapter 9.2.

In one subembodiment of the above embodiment, the first radio signal comprises HARQ-ACK.

In one subembodiment of the above embodiment, the first radio signal is transmitted on an uplink physical layer control channel (i.e., an uplink channel can only be used for bearing a physical-layer signaling).

In one subembodiment of the above embodiment, the first signaling is a dynamic signaling used for downlink grant.

In one embodiment, the first signaling indicates a first offset, and a time interval between the third time window and the reference time window is the first offset.

In one subembodiment of the above embodiment, the third field in the first signaling indicates the first offset.

In one subembodiment of the above embodiment, a time interval between the third time window and the second time window is the first offset.

In one subembodiment of the above embodiment, the first offset is a non-negative integer.

In one subembodiment of the above embodiment, the first offset is measured by slot.

In one subembodiment of the above embodiment, the first offset is measured by subframe.

In one subembodiment of the above embodiment, the first offset is measured by ms.

In one subembodiment of the above embodiment, the first offset is measured by multicarrier symbol.

Embodiment 10

Figure 10:
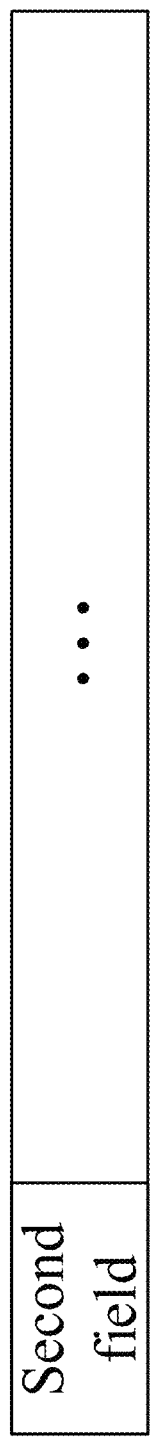
FIG. 10 illustrates a schematic diagram of a second signaling according to one embodiment of the present disclosure.

Embodiment 10 illustrates a schematic diagram of a second signaling, as shown in FIG. 10.

In Embodiment 10, the second signaling is associated with the first signaling in the present disclosure; the first signaling and the second signaling respectively comprise the first field and the second field in the present disclosure. The first signaling comprises scheduling information of the first radio signal in the present disclosure. Time resources occupied by the first signaling, the second signaling and the first radio signal respectively belong to the first time window, the second time window and the third time window. The first signaling indicates a time interval between the third time window and a reference time window. The first field in the first signaling indicates that the reference time window is not the first time window. When the first field in the first signaling indicates that the reference time window is not the first time window, the second field indicates whether the reference time window is the second time window. The second field in the second signaling indicates that the reference time window is the second time window.

In one embodiment, the second field is a PUSCH trigger B field, and the specific definition of the PUSCH trigger B field can be found in 3GPP TS36.212, chapter 5.3.3 and 3GPP TS36.213, chapter 8.

In one embodiment, the second field consists of 1 bit.

In one embodiment, the second field consists of 2 bits.

Embodiment 11

Figure 11:
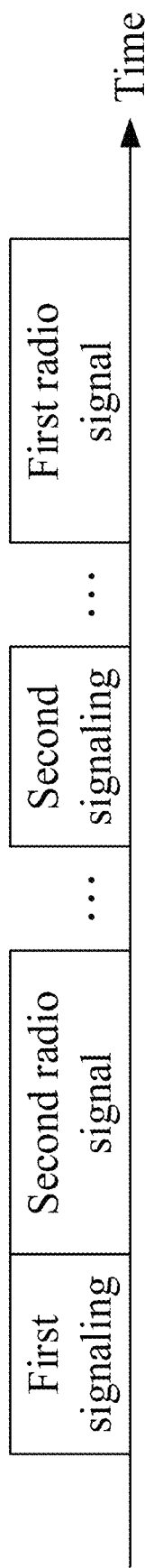
FIG. 11 illustrates a schematic diagram of sequential relationships among a first signaling, a second signaling, a first radio signal and a second radio signal in time domain according to one embodiment of the present disclosure.

Embodiment 11 illustrates a schematic diagram of sequential relationships among a first signaling, a second signaling, a first radio signal and a second radio signal in time domain, as shown in FIG. 11.

In Embodiment 11, the first signaling comprises first-type scheduling information of the first radio signal and second-type scheduling information of the second radio signal. Time resources occupied by the second signaling is used for determining time resources occupied by the first radio signal. Time resources occupied by the first signaling, the second signaling and the first radio signal respectively belong to the first time window, the second time window and the third time window. The second radio signal is used for determining the first radio signal. The second time window is later than the first time window in time domain, and the third time window is later than the second time window and time resources occupied by the second radio signal in time domain.

In one embodiment, the second radio signal comprises downlink data.

In one subembodiment of the above embodiment, the first radio signal comprises HARQ-ACK.

In one embodiment, the second radio signal comprises a downlink reference signal.

In one subembodiment of the above embodiment, the first radio signal comprises CSI.

In one embodiment, the second radio signal comprises a Channel State Information-Reference Signal (CSI-RS).

In one embodiment, the second radio signal comprises a Synchronization Signal/Physical Broadcast CHannel block (SS/PBCH block)

Embodiment 12

Figure 12:
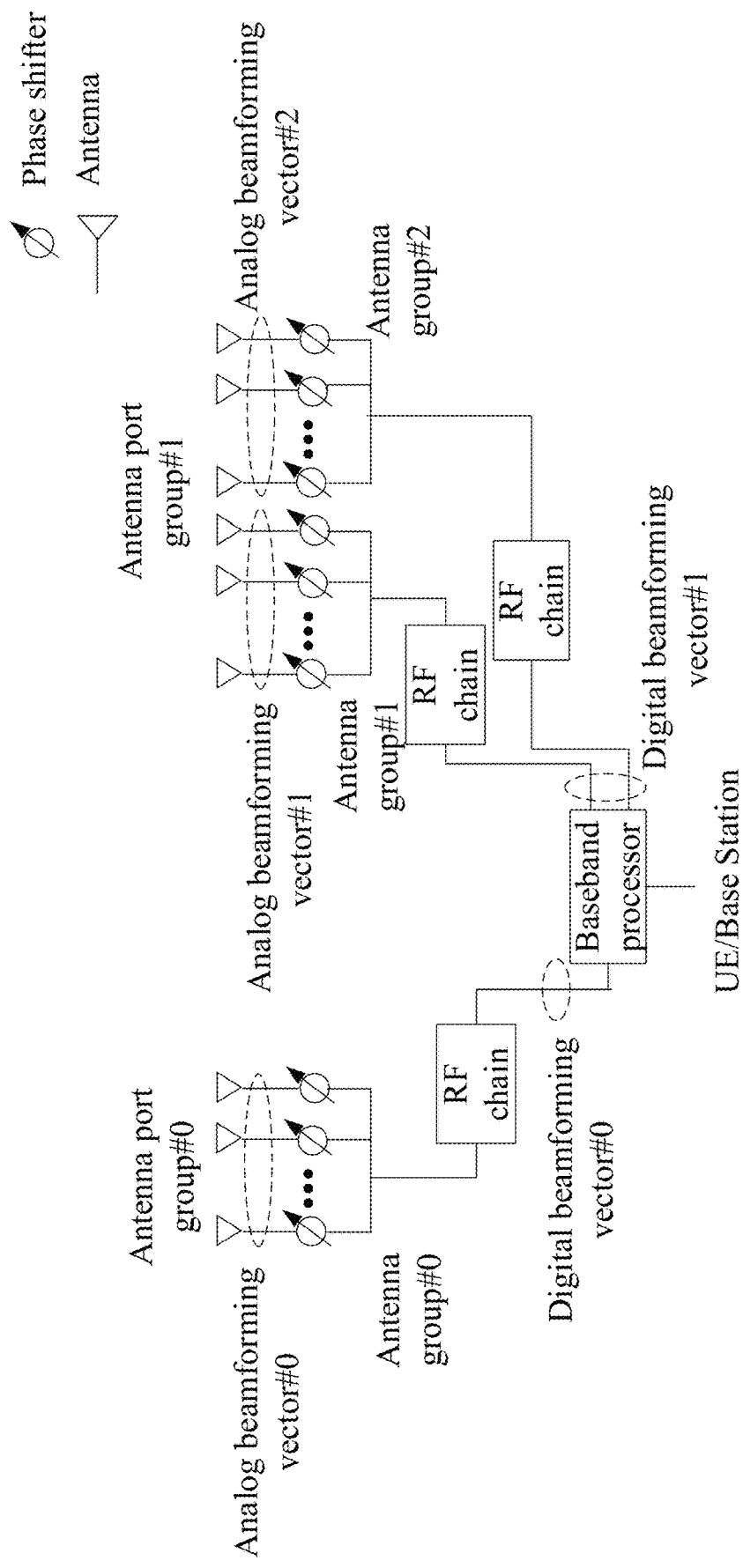
FIG. 12 illustrates a schematic diagram of antenna ports and antenna port groups according to one embodiment of the present disclosure.

Embodiment 12 illustrates a schematic diagram of antenna ports and antenna port groups, as shown in FIG. 12.

In Embodiment 12, an antenna port group comprises a positive integer number of antenna port(s); one antenna port is formed by superposition of antennas of a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. Mapping coefficients from all antennas of a positive integer number of antenna group(s) comprised in a given antenna port to the given antenna port constitute a beamforming vector corresponding to the given antenna port. Mapping coefficients from multiple antennas comprised in any given antenna group within a positive integer number of antenna group(s) comprised in the given antenna port to the given antenna port constitute an analog beamforming vector of the given antenna group. Analog beamforming vectors corresponding to the positive integer number of antenna group(s) comprised in the given antenna port are arranged diagonally to form an analog beamforming matrix corresponding to the given antenna port. Mapping coefficients from the positive integer number of antenna group(s) comprised in the given antenna port to the given antenna port constitute a digital beamforming vector corresponding to the given antenna port. A beamforming vector corresponding to the given antenna port is acquired as a product of the analog beamforming matrix and the digital beamforming vector corresponding to the given antenna port. Different antenna ports in one antenna port group consist of a same antenna group, and different antenna ports in a same antenna port group correspond to different beamforming vectors.

FIG. 12 illustrates two antenna port groups, namely, antenna port group #0 and antenna port group #1. Herein, the antenna port group #0 consists of antenna group #0, and the antenna port group #1 consists of antenna group #1 and antenna group #2. Mapping coefficients from multiple antennas of the antenna group #0 to the antenna port group #0 constitute an analog beamforming vector #0; mapping coefficients from the antenna group #0 to the antenna port group #0 constitute a digital beamforming vector #0; mapping coefficients from multiple antennas of the antenna group #1 and multiple antennas of the antenna group #2 to one antenna port in the antenna port group #1 respectively constitute an analog beamforming vector #1 and an analog beamforming vector #2; mapping coefficients from the antenna group #1 and the antenna group #2 to one antenna port in the antenna port group #1 constitute a digital beamforming vector #1. A beamforming vector corresponding to one antenna port of the antenna port group #0 is acquired as a product of the analog beamforming vector #0 and the digital beamforming vector #0. A beamforming vector corresponding to one antenna port of the antenna port group #1 is acquired as a product of an analog beamforming matrix formed by the analog beamforming vector #1 and the analog beamforming vector #2 arranged diagonally and the digital beamforming vector #1.

In one embodiment, an antenna port group only comprises one antenna group, that is, one RF chain, for instance, the antenna port group #0 in FIG. 12.

In one subembodiment of the above embodiment, an analog beamforming matrix corresponding to an antenna port of the one antenna port group is subjected to dimensionality reduction to form an analog beamforming vector, and a digital beamforming vector corresponding to an antenna port of the one antenna port group is subjected to dimensionality reduction to form a scaler, a beamforming vector corresponding to an antenna port of the one antenna port group is equal to an analog beamforming vector corresponding thereto. For example, the antenna port group #0 in FIG. 12 only comprises the antenna group #0, the digital beamforming vector #0 in FIG. 12 is subjected to dimensionality reduction to form a scaler, a beamforming vector corresponding to an antenna port of the antenna port group #0 is the analog beamforming vector #0.

In one subembodiment of the above embodiment, the one antenna port group comprises one antenna port.

In one embodiment, one antenna port group comprises a plurality of antenna groups, that is, a plurality of RF chains, for example, the antenna port group #1 in FIG. 12.

In one subembodiment of the above embodiment, the antenna port group comprises a plurality of antenna ports.

In one subembodiment of the above embodiment, different antenna ports of the one antenna port group correspond to a same analog beamforming matrix.

In one subembodiment of the above embodiment, different antenna ports of the one antenna port group correspond to different digital beamforming vectors.

In one embodiment, antenna ports in different antenna port groups correspond to different analog beamforming matrices.

In one embodiment, a small-scale channel parameter that a radio signal transmitted from one antenna port goes through can be used to infer a small-scale channel parameter that the other radio signal transmitted from the one antenna port goes through.

In one subembodiment of the above embodiment, the small-scale channel parameter includes one or more of Channel Impulse Response (CIR), a Precoding Matrix Indicator (PMI), a Channel Quality Indicator (CQI), and a Rank Indicator (RI).

In one embodiment, any two antenna ports in an antenna port group are Quasi Co-Located (QCL).

In one embodiment, the specific meaning of QCL can be found in 3GPP TS38.214, chapter 5.1.5.

In one embodiment, the phrase that two antenna ports are QCL refers to: all or part of large-scale properties of a radio signal transmitted by the one antenna port can be used to infer all or part of large-scale properties of a radio signal transmitted by the other antenna port.

In one embodiment, the large-scale properties of a radio signal include one or more of delay spread, Doppler spread, Doppler shift, path loss, average gain, average delay, spatial Rx parameters, and spatial Tx parameters.

In one embodiment, Spatial Rx parameters include one or more of a receiving beam, a receiving analog beamforming matrix, a receiving analog beamforming vector, a receiving beamforming vector, a receiving spatial filter and a spatial domain reception filter.

In one embodiment, Spatial Tx parameters include one or more of a transmitting antenna port, a transmitting antenna port group, a transmitting beam, a transmitting analog beamforming matrix, a transmitting analog beamforming vector, a transmitting beamforming vector, a transmitting spatial filter, and a spatial domain transmission filter.

In one embodiment, the phrase that two antenna ports are QCL refers to: the one antenna port and the other antenna port at least have a same QCL parameter.

In one embodiment, a QCL parameter include: one or more of delay spread, Doppler spread, Doppler shift, path loss, average gain, average delay, spatial Rx parameters, and spatial Tx parameters.

In one embodiment, the phrase that two antenna ports are QCL refers to: at least one QCL parameter of the one antenna port can be used to infer at least one QCL parameter of the other antenna port.

Embodiment 13

Figure 13:
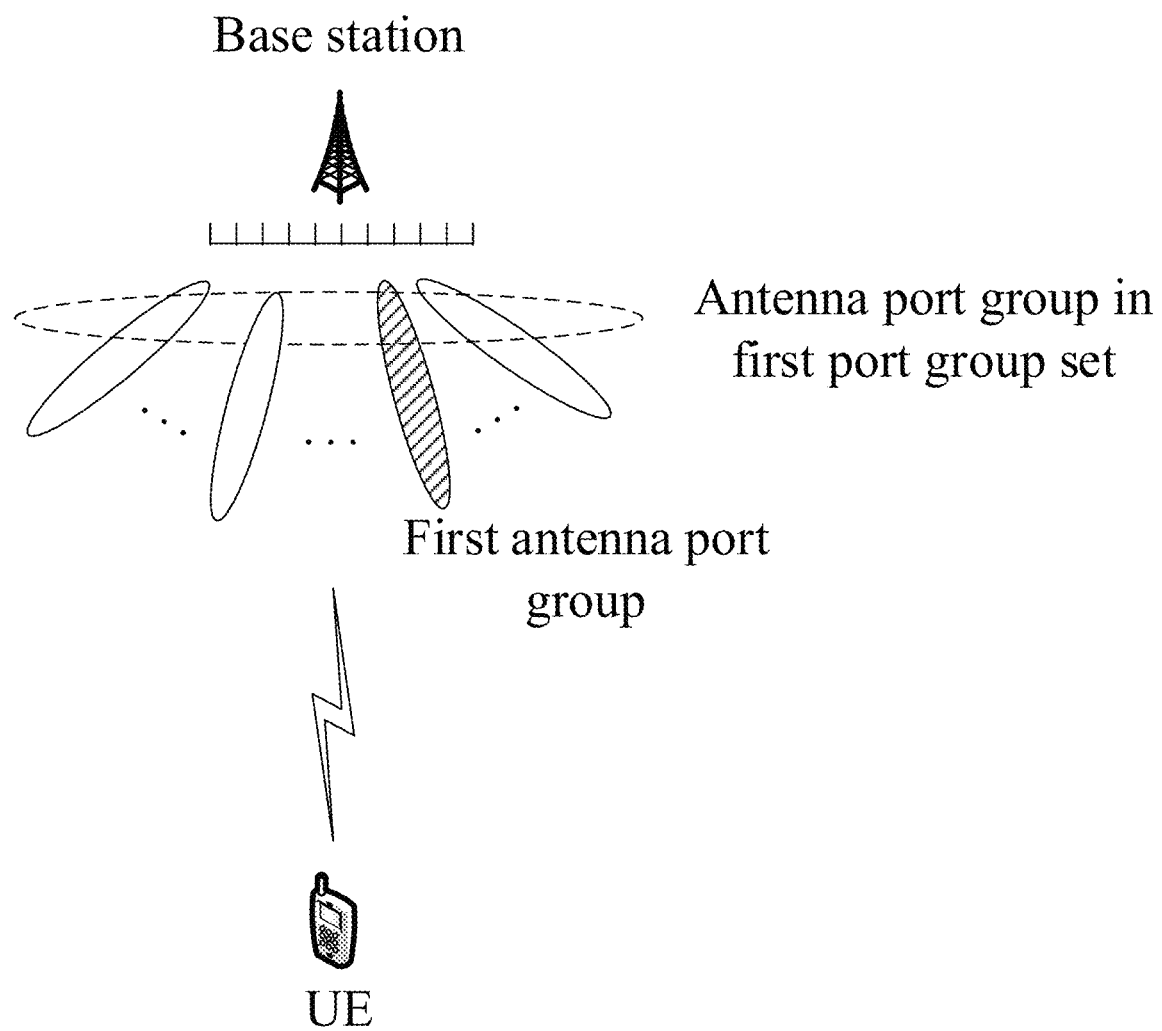
FIG. 13 illustrates a schematic diagram of a relationship between a first antenna port and a first port group set according to one embodiment of the present disclosure.

Embodiment 13 illustrates a schematic diagram of a relationship between a first antenna port group and a first port group set, as shown in FIG. 13.

In Embodiment 13, the first signaling in the present disclosure is used for determining the first antenna port group, and the second signaling in the present disclosure is used for determining the first port group set; the first port group set comprises a positive integer number of antenna port group(s), and one antenna port group comprises a positive integer number of antenna port(s); and the first antenna port group belongs to the first port group set. In FIG. 13, an ellipse represents an antenna port in the first port group set, and an ellipse filled with left slashes represents the first antenna port group.

In one embodiment, the first port group set comprises multiple antenna port groups.

In one embodiment, the first port group set comprises one antenna port group.

In one embodiment, the first antenna port group comprises multiple antenna ports.

In one embodiment, the first antenna port group comprises one antenna port.

In one embodiment, a first reference antenna port group and a second reference antenna port group are any two antenna port groups comprised in the first port group set, and any antenna port in the first reference antenna port group and any antenna port in the second reference antenna port group are not QCL.

In one embodiment, the first signaling explicitly indicates the first antenna port group.

In one embodiment, the first signaling implicitly indicates the first antenna port group.

In one embodiment, any transmitting antenna port of the first signaling and at least one antenna port in the first antenna port group are QCL.

In one embodiment, any transmitting antenna port of DMRS corresponding to a physical-layer channel where the first signaling is located and at least one antenna port in the first antenna port group are QCL.

In one embodiment, any transmitting antenna port of the first signaling and any antenna port in the first antenna port group are QCL.

In one embodiment, any transmitting antenna port of DMRS corresponding to a physical-layer channel where the first signaling is located and any antenna port in the first antenna port group are QCL.

In one embodiment, at least one transmitting antenna port of the first signaling and one antenna port in the first antenna port group are QCL.

In one embodiment, at least one transmitting antenna port of DMRS corresponding to a physical-layer channel where the first signaling is located and one antenna port in the first antenna port group are QCL.

In one embodiment, time-frequency resources occupied by the first signaling belong to a first time-frequency resource pool, the first time-frequency resource pool being associated with the first antenna port group.

In one subembodiment of the above embodiment, the first time-frequency resource pool comprises a positive integer number of REs.

In one subembodiment of the above embodiment, the first time-frequency resource pool is a COntrol REsource SET (CORESET).

In one subembodiment of the above embodiment, the first time-frequency resource pool is a search space.

In one subembodiment of the above embodiment, the first time-frequency resource pool appears multiple times in time domain.

In one reference embodiment of the above subembodiment, time intervals of the first time-frequency resource pool between any two adjacent appearances in time domain are equal.

In one subembodiment of the above embodiment, the first time-frequency resource pool appears only once in time domain.

In one embodiment, the phrase that a given time-frequency resource pool is associated with a given antenna port group refers to: it can be assumed that a transmitting antenna port of any radio signal transmitted in the given time-frequency resource pool and an antenna port in the given antenna port group are QCL.

In one embodiment, the phrase that a given time-frequency resource pool is associated with a given antenna port group refers to: Spatial Rx parameters used by the UE in the present disclosure for receiving a radio signal transmitted in the given antenna port group are used for determining Spatial Rx parameters used by the UE for receiving or monitoring a radio signal in the given time-frequency resource pool.

In one embodiment, the phrase that a given time-frequency resource pool is associated with a given antenna port group refers to: the UE in the present disclosure uses same Spatial Rx parameters to receive a radio signal transmitted on the given antenna port group and receive or monitor a radio signal in the given time-frequency resource pool.

In one embodiment, the second signaling explicitly indicates the first port group set.

In one embodiment, the second signaling implicitly indicates the first port group set.

In one embodiment, the second signaling is repeatedly transmitted by multiple different antenna ports.

In one embodiment, any transmitting antenna port of the second signaling and at least one antenna port in one antenna port group in the first port group set are QCL.

In one embodiment, any transmitting antenna port of DMRS corresponding to a physical-layer channel where the second signaling is located and at least one antenna port in one antenna port group in the first port group set are QCL.

In one embodiment, one antenna port in any antenna port group in the first port group set and at least one transmitting antenna port in the second signaling are QCL.

In one embodiment, one antenna port in any antenna port group in the first port group set and at least one transmitting antenna port of DMRS corresponding to a physical-layer channel where the second signaling is located are QCL.

In one embodiment, the first port group set comprises K1 antenna port group(s), the second signaling is respectively transmitted by K1 antenna port(s), the K1 antenna port(s) respectively correspond(s) to the K1 antenna port group(s), and any of the K1 antenna port(s) and one antenna port in the corresponding antenna port group are QCL, the K1 being a positive integer.

In one subembodiment of the above embodiment, the UE in the present disclosure receives the second signaling transmitted by different antenna ports with same Spatial Rx parameters.

In one subembodiment of the above embodiment, the UE in the present disclosure receives the second signaling transmitted by different antenna ports with different Spatial Rx parameters.

In one embodiment, time-frequency resources occupied by the second signaling are used for determining the first port group set.

In one embodiment, time-frequency resources occupied by the second signaling indicate the first port group set.

In one embodiment, time-frequency resources occupied by the second signaling belong to a second time-frequency resource pool, the second time-frequency resource pool being associated with a second antenna port group; spatial coverage of a transmitting beam corresponding to any antenna port in the first port group set is located within a spatial coverage set of transmitting beams of all antenna ports in the second antenna port group.

In one embodiment, the first antenna port group is used for determining a transmitting antenna port of the first radio signal in the present disclosure.

In one embodiment, Spatial Rx parameters used by the UE in the present disclosure to receive a radio signal from the first antenna port group are used for determining Spatial Tx parameters of the first radio signal.

In one embodiment, any transmitting antenna port of the second radio signal in the present disclosure and at least one antenna port in the first antenna port group are QCL.

In one embodiment, any transmitting antenna port of DMRS corresponding to a physical-layer channel where the second radio signal is located and at least one antenna port in the first antenna port group are QCL.

In one embodiment, any transmitting antenna port of the second radio signal and any antenna port in the first antenna port group are QCL.

In one embodiment, any transmitting antenna port of DMRS corresponding to a physical-layer channel where the second radio signal is located and any antenna port in the first antenna port group are QCL.

In one embodiment, at least one transmitting antenna port of the second radio signal and one antenna port in the first antenna port group are QCL.

In one embodiment, at least one transmitting antenna port of DMRS corresponding to a physical-layer channel where the second radio signal is located and one antenna port in the first antenna port group are QCL.

Embodiment 14

Figure 14:
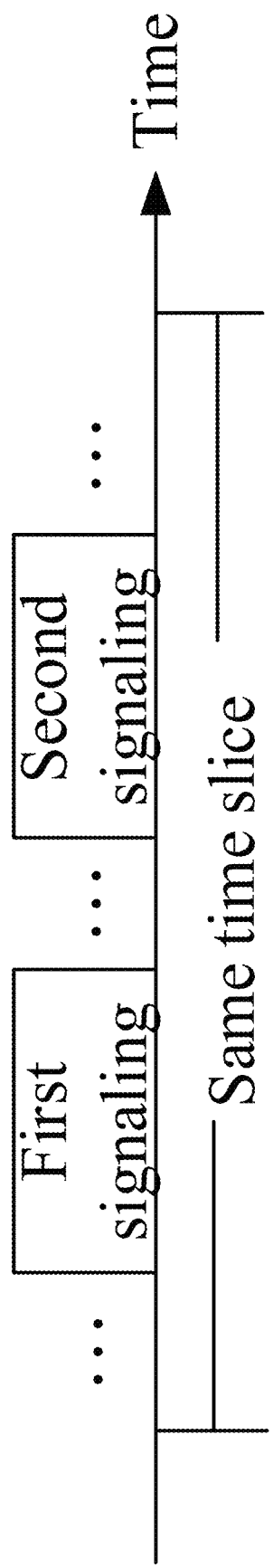
FIG. 14 illustrates a schematic diagram of a relationship between time resources occupied by a first signaling and a second signaling according to one embodiment of the present disclosure.

Embodiment 14 illustrates a schematic diagram of a relationship between time resources occupied by a first signaling and a second signaling, as shown in FIG. 14.

In Embodiment 14, the first signaling and the second signaling occupy a same time slice in time domain, the same time slice comprising a positive integer number of multicarrier symbol(s).

In one embodiment, the first signaling and time resources occupied by the second signaling belong to the same time slice.

In one embodiment, the first time window in the present disclosure and the second time window in the present disclosure both belong to the same time slice.

In one embodiment, the same time slice consists of a positive integer number of consecutive multicarrier symbol(s).

In one embodiment, the same time slice consists of a positive integer number of inconsecutive multicarrier symbol(s).

In one embodiment, the same time slice comprises 14 consecutive multicarrier symbols.

In one embodiment, the same time slice belongs to a slot.

In one embodiment, the same time slice belongs to a subframe.

In one embodiment, the same time slice belongs to a Downlink Burst.

In one embodiment, the third signaling in the present disclosure indicates that a first multicarrier symbol group is occupied, the first multicarrier symbol group comprising a positive integer number of multicarrier symbol(s); and the same time slice belongs to the first multicarrier symbol group.

In one embodiment, the third signaling in the present disclosure indicates that the first multicarrier symbol group is occupied by a downlink physical-layer channel or a downlink physical signal.

In one embodiment, all multicarrier symbols in the first multicarrier symbol group are consecutive.

In one embodiment, there exist at least two adjacent multicarrier symbols in the first multicarrier symbol group being inconsecutive.

In one embodiment, all multicarrier symbols in the first multicarrier symbol group belong to a same slot.

In one embodiment, all multicarrier symbols in the first multicarrier symbol group belong to a same subframe.

In one embodiment, there exist at least two multicarrier symbols in the first multicarrier symbol group belonging to different slots.

In one embodiment, there exist at least two multicarrier symbols in the first multicarrier symbol group belonging to different subframes.

Embodiment 15

Figure 15:
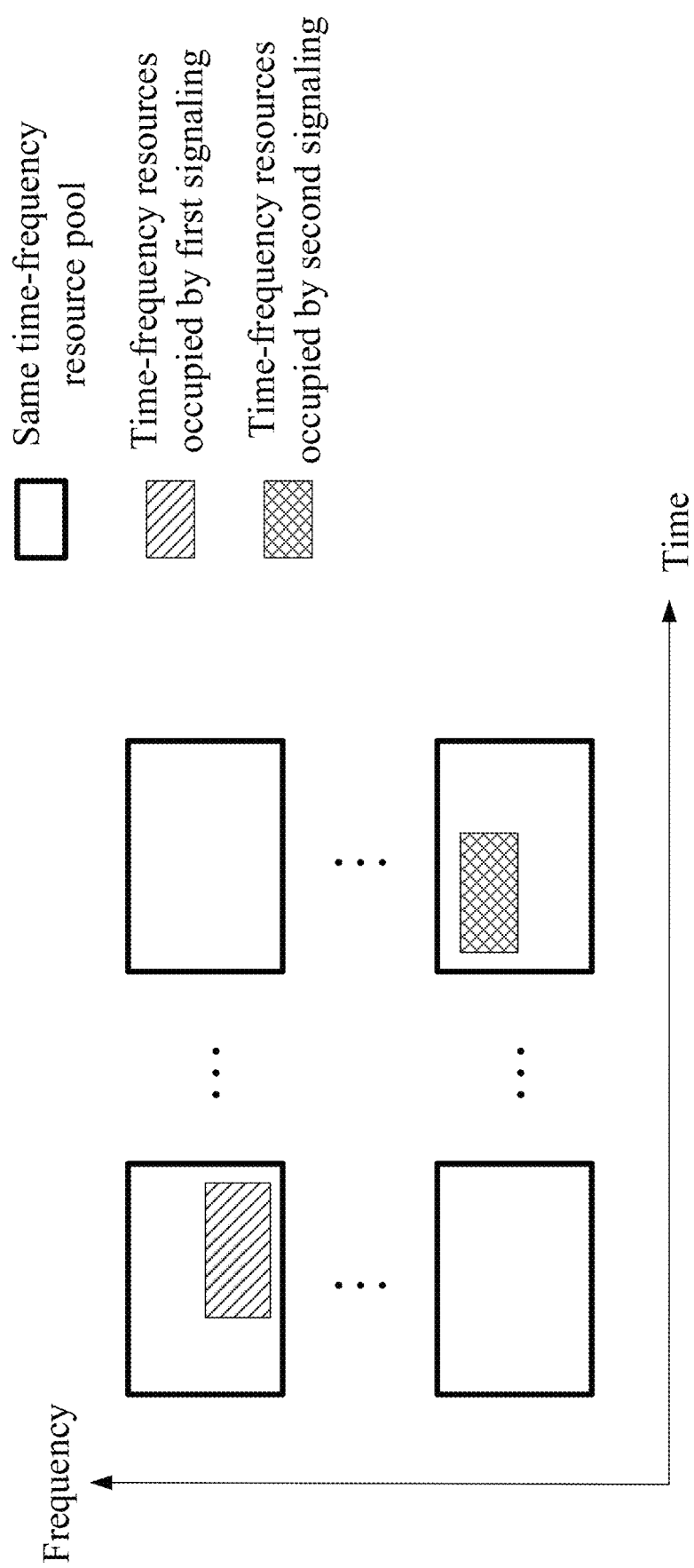
FIG. 15 illustrates a schematic diagram of a relationship between time-frequency resources occupied by a first signaling and a second signaling according to one embodiment of the present disclosure.

Embodiment 15 illustrates a schematic diagram of a relationship between time-frequency resources occupied by a first signaling and a second signaling, as shown in FIG. 15.

In Embodiment 15, time-frequency resources occupied by the first signaling and time-frequency resources occupied by the second signaling belong to a same time-frequency resource pool, the same time-frequency resource pool comprising a positive integer number of REs. In FIG. 15, a solid box represents the same time-frequency resource pool, a box filled with left slashes represents time-frequency resources occupied the first signaling, and a box filled with cross lines represents time-frequency resources occupied by the second signaling.

In one embodiment, the same time-frequency resource pool refers to a same CORESET.

In one embodiment, the same time-frequency resource pool refers to a same search space.

In one embodiment, an RE occupies a multicarrier symbol in time domain, and a subcarrier in frequency domain.

In one embodiment, the same time-frequency resource pool appears multiple times in time domain.

In one subembodiment of the above embodiment, time intervals of the same time-frequency resource pool between any two adjacent appearances in time domain are equal.

In one embodiment, the same time-frequency resource pool appears only once in time domain.

In one embodiment, the same time-frequency resource pool is associated with the first antenna port group in the present discourse.

Embodiment 16

Figure 16:
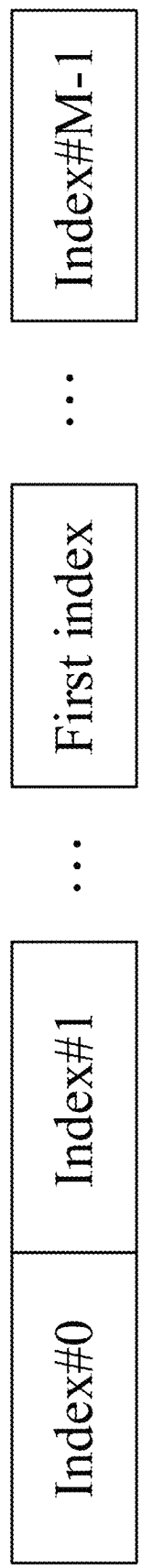
FIG. 16 illustrates a schematic diagram of a relationship between a first index and M index(es) according to one embodiment of the present disclosure.

Embodiment 16 illustrates a schematic diagram of a relationship between a first index and M index(es), as shown in FIG. 16.

In Embodiment 16, the first signaling in the present disclosure is used for determining the first index, and the second signaling in the present disclosure is used for determining the M index(es), the first index being an index among the M index(es); the M is a positive integer. In FIG. 16, the M index(es) is(are) respectively represented by Index #0, Index #1, . . . , Index #M−1.

In one embodiment, the first index is a non-negative integer.

In one embodiment, any of the M index(es) is a non-negative integer.

In one embodiment, the M is greater than 1.

In one embodiment, the M is equal to 1.

In one embodiment, the first signaling explicitly indicates the first index.

In one embodiment, if the first signaling indicates that the reference time window in the present disclosure is not the first time window in the present disclosure, the first signaling explicitly indicates the first index; if the first signaling indicates that the reference time window is the first time window, the first signaling does not explicitly indicate the first index.

In one embodiment, if the first field in the first signaling is not equal to the first value, the first signaling explicitly indicates the first index; if the first field in the first signaling is equal to the first value, the first signaling does not explicitly indicate the first index.

In one embodiment, the first signaling implicitly indicates the first index.

In one embodiment, time-frequency resources occupied by the first signaling are used for determining the first index.

In one embodiment, time-frequency resources occupied by the first signaling belong to a first time-frequency resource pool, the first time-frequency resource pool being one of N1 time-frequency resource pools, and an index of the first time-frequency resource pool among the N1 time-frequency resource pools is used for determining the first index, the N1 being a positive integer greater than 1.

In one embodiment, the first signaling is used for determining a first antenna port group, the first antenna port group being used for determining the first index.

In one embodiment, the first signaling is used for determining a first antenna port group, the first antenna port group being one of N2 antenna port groups, and an index of the first antenna port group among the N2 antenna port groups is used for determining the first index, the N2 being a positive integer greater than 1.

In one embodiment, time-frequency resources occupied by the first radio signal are used for determining the first index.

In one embodiment, time-frequency resources occupied by the first radio signal belong to a third time-frequency resource pool, the third time-frequency resource pool being one of N5 time-frequency resource pools, and an index of the third time-frequency resource pool among the N5 time-frequency resource pools is used for determining the first index, the N5 being a positive integer greater than 1.

In one embodiment, time-frequency resources occupied by the second radio signal are used for determining the first index.

In one embodiment, time-frequency resources occupied by the second radio signal belong to a fourth time-frequency resource pool, the fourth time-frequency resource pool being one of N6 time-frequency resource pools, and an index of the fourth time-frequency resource pool among the N6 time-frequency resource pools is used for determining the first index, the N6 being a positive integer greater than 1.

In one embodiment, a transmitting antenna port of the second radio signal is used for determining the first index.

In one embodiment, a transmitting antenna port of the second radio signal is one of N7 antenna port groups, and an index of a transmitting antenna port group of the second radio signal in the N7 antenna port groups is used for determining the first index, the N7 being a positive integer greater than 1.

In one embodiment, the third subband is used for determining the first index.

In one embodiment, the third subband is one of N8 candidate subbands, and an index of the third subband among the N8 candidate subbands is used for determining the first index, the N8 being a positive integer greater than 1.

In one embodiment, the second signaling explicitly indicates the M index(es).

In one embodiment, if the second signaling indicates that the reference time window in the present disclosure is the second time window in the present disclosure, the second signaling explicitly indicates the M index(es); if the second signaling indicates that the reference time window in the present disclosure is not the second time window in the present disclosure, the second signaling does not explicitly indicate the M index(es).

In one embodiment, if the second field in the second signaling is equal to the second value, the second signaling explicitly indicates the M index(es); if the second field in the second signaling is not equal to the second value, the second signaling does not explicitly indicate the M index(es).

In one embodiment, the second signaling implicitly indicates the M index(es).

In one embodiment, time-frequency resources occupied by the second signaling are used for determining the M index(es).

In one embodiment, time-frequency resources occupied by the second signaling belong to a second time-frequency resource pool, the second time-frequency resource pool being one of N3 time-frequency resource pools, and an index of the second time-frequency resource pool among the N3 time-frequency resource pools is used for determining the M index(es), the N3 being a positive integer greater than 1.

In one embodiment, the second signaling is used for determining a first port group set, the first port group set being used for determining the M index(es).

In one embodiment, the second signaling is used for determining a first port group set, the first port group set comprising M antenna port group(s), and the M antenna port group(s) respectively correspond(s) to the M index(es); the M antenna port group(s) is(are) subset(s) of N4 antenna port groups, and an index of any of the first antenna port group among the N4 antenna port group is used for determining a corresponding index among the M index(es), the N4 being a positive integer greater than 1.

Embodiment 17

Figure 17:
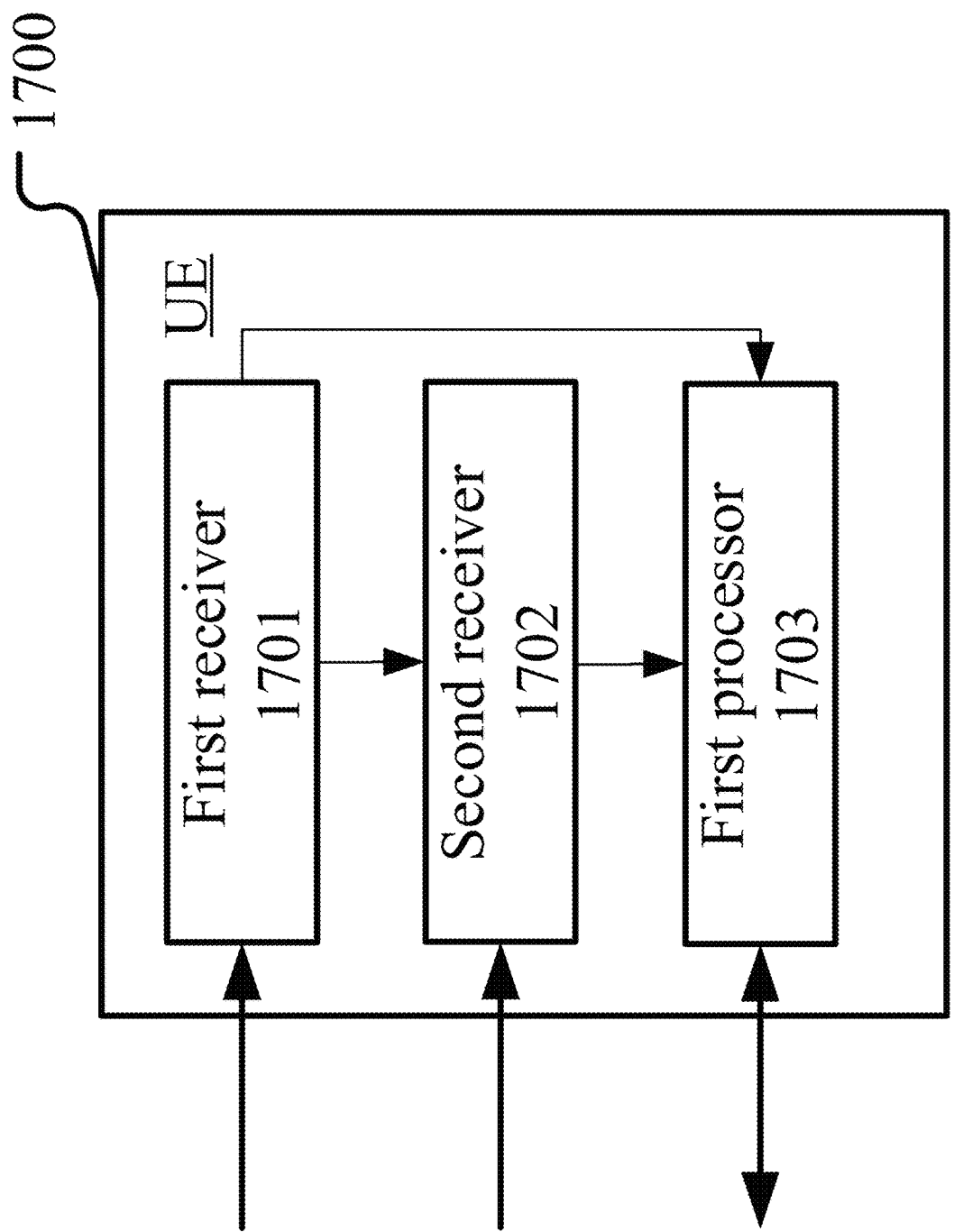
FIG. 17 illustrates a structure block diagram of a processing apparatus in a UE according to one embodiment of the present disclosure.

Embodiment 17 illustrates a block diagram of a processing apparatus for a UE, as shown in FIG. 17. In FIG. 17, the processing apparatus 1700 in the UE mainly consists of a first receiver 1701, a second receiver 1702 and a first processor 1703.

In Embodiment 17, the first receiver 1701 receives a first signaling in a first time window in a first subband; the second receiver 1702 monitors a second signaling in a second time window in a second subband; if the second receiver 1702 successfully receives the second signaling in the second time window in the second subband, the first processor 1703 transmits a first radio signal in the third time window in the third subband; otherwise the first processor 1703 drops transmission of the first radio signal in the third time window in the third subband.

In Embodiment 17, the first signaling comprises first-type scheduling information of the first radio signal; the first signaling indicates a time interval between the third time window and the second time window; the first signaling is associated with the second signaling.

In one embodiment, the first signaling indicates a time interval between the third time window and a reference time window; the first signaling comprises a first field, the first field indicating whether the reference time window is the first time window; and the first field in the first signaling indicates that the reference time window is not the first time window.

In one embodiment, the second signaling comprises a second field, the second field indicating whether the reference time window is the second time window; and the second field in the second signaling indicates that the reference time window is the second time window.

In one embodiment, the first processor 1703 also receives a second radio signal; wherein the first signaling comprises second-type scheduling information of the second radio signal; and the first radio signal is used for determining whether the second radio signal is correctly received.

In one embodiment, the first processor 1703 also receives a second radio signal; wherein the first signaling comprises second-type scheduling information of the second radio signal; and a measurement performed on the second radio signal is used for determining the first radio signal.

In one embodiment, the first signaling is used for determining a first antenna port group, and the second signaling is used for determining a first port group set; the first port group set comprises a positive integer number of antenna port group(s), and one antenna port group comprises a positive integer number of antenna port(s); and the first antenna port group belongs to the first port group set.

In one embodiment, the first signaling and the second signaling occupy a same time slice in time domain, the same time slice comprising a positive integer number of multicarrier symbol(s).

In one embodiment, the second receiver 1702 also receives a third signaling; wherein the third signaling indicates that a first multicarrier symbol group is occupied, the first multicarrier symbol group comprising a positive integer number of multicarrier symbol(s); and the same time slice belongs to the first multicarrier symbol group.

In one embodiment, time-frequency resources occupied by the first signaling and time-frequency resources occupied by the second signaling belong to a same time-frequency resource pool, a time-frequency resource pool comprising a positive integer number of REs.

In one embodiment, the first signaling is used for determining a first index, and the second signaling is used for determining M index(es), the first index being one of the M index(es); and the M is a positive integer.

In one embodiment, the first receiver 1701 comprises at least one of the antenna 452, the receiver 454, the receiving processor 456, the multi-antenna receiving processor 458, the controller/processor 459, the memory 460, or the data source 467 in Embodiment 4.

In one embodiment, the second receiver 1702 comprises at least one of the antenna 452, the receiver 454, the receiving processor 456, the multi-antenna receiving processor 458, the controller/processor 459, the memory 460, or the data source 467 in Embodiment 4.

In one embodiment, the first processor 1703 comprises at least one of the antenna 452, the transmitter/receiver 454, the transmitting processor 468, the receiving processor 456, the multi-antenna transmitting processor 457, the multi-antenna receiving processor 458, the controller/processor 459, the memory 460 or the data source 467 in Embodiment 4.

Embodiment 18

Figure 18:
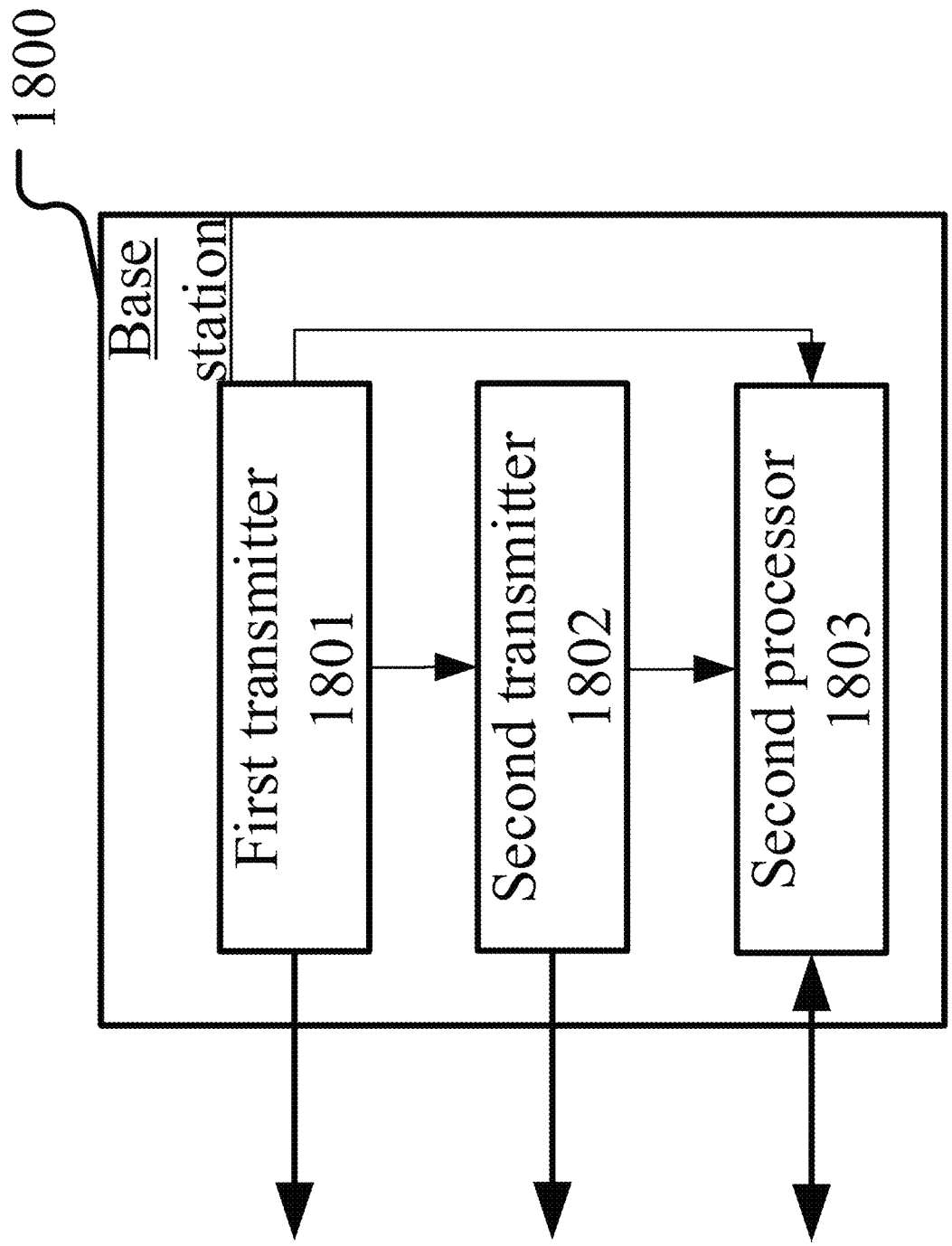
FIG. 18 illustrates a structure block diagram of a processing apparatus in a base station according to one embodiment of the present disclosure.

Embodiment 18 illustrates a block diagram of a processing apparatus used for a base station, as shown in FIG. 18.

In FIG. 18, the processing apparatus 1800 in the base station mainly consists of a first transmitter 1801, a second transmitter 1802 and a second processor 1803.

In Embodiment 18, the first transmitter 1801 transmits a first signaling in a first time window in a first subband; the second transmitter 1802 transmits a second signaling in a second time window in a second subband, or drops transmission of the second signaling in the second time window in the second subband; if the second transmitter 1802 transmits the second signaling in the second time window in the second subband, the second processor 1803 receives a first radio signal in a third time window in a third subband, otherwise the second processor 1803 drops reception of the first radio signal in the third time window in the third subband.

In Embodiment 18, the first signaling comprises first-type scheduling information of the first radio signal; the first signaling indicates a time interval between the third time window and the second time window; and the first signaling is associated with the second signaling.

In one embodiment, the first signaling indicates a time interval between the third time window and a reference time window; the first signaling comprises a first field, the first field indicating whether the reference time window is the first time window; and the first field in the first signaling indicates that the reference time window is not the first time window.

In one embodiment, the second signaling comprises a second field, the second field indicating whether the reference time window is the second time window; and the second field in the second signaling indicates that the reference time window is the second time window.

In one embodiment, the second processor 1803 also transmits a second radio signal; wherein the first signaling comprises second-type scheduling information of the second radio signal; and the first radio signal is used for determining whether the second radio signal is correctly received.

In one embodiment, the second processor 1803 also transmits a second radio signal; wherein the first signaling comprises second-type scheduling information of the second radio signal; and a measurement performed on the second radio signal is used for determining the first radio signal.

In one embodiment, the first signaling is used for determining a first antenna port group, and the second signaling is used for determining a first port group set; the first port group set comprises a positive integer number of antenna port group(s), and one antenna port group comprises a positive integer number of antenna port(s); and the first antenna port group belongs to the first port group set.

In one embodiment, the first signaling and the second signaling occupy a same time slice in time domain, the same time slice comprising a positive integer number of multi-carrier symbol(s).

In one embodiment, the second transmitter 1802 also transmits a third signaling; wherein the third signaling indicates that a first multicarrier symbol group is occupied, the first multicarrier symbol group comprising a positive integer number of multicarrier symbol(s); and the same time slice belongs to the first multicarrier symbol group.

In one embodiment, time-frequency resources occupied by the first signaling and time-frequency resources occupied by the second signaling belong to a same time-frequency resource pool, a time-frequency resource pool comprising a positive integer number of REs.

In one embodiment, the first signaling is used for determining a first index, and the second signaling is used for determining M index(es), the first index being one of the M index(es); and the M is a positive integer.

In one embodiment, the first transmitter 1801 comprises at least one of the antenna 420, the transmitter 418, the transmitting processor 416, the multi-antenna transmitting processor 471, the controller/processor 475, or the memory 476 in Embodiment 4.

In one embodiment, the second transmitter 1802 comprises at least one of the antenna 420, the transmitter 418, the transmitting processor 416, the multi-antenna transmitting processor 471, the controller/processor 475, or the memory 476 in Embodiment 4.

In one embodiment, the second processor 1803 comprises at least one of the antenna 420, the transmitter/receiver 418, the transmitting processor 416, the receiving processor 470, the multi-antenna transmitting processor 471, the multi-antenna receiving processor 472, the controller/processor 475 or memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method applied to a user equipment (UE) for wireless communication, the method comprising:
    receiving a first signaling in a first time window in a first subband, wherein the first signaling is configured to indicate a first antenna port group, one antenna port group comprises a positive integer number of antenna port(s), and the first signaling is configured to indicate a first index;
    monitoring a second signaling in a second time window in a second subband, wherein the second signaling comprises downlink control information (DCI), the second signaling is configured to indicate a first port group set that comprises a positive integer number of antenna port group(s), the second signaling is configured to indicate M index(es) where M is greater than or equal to 1, the first index is one of the M index(es), and the second signaling is transmitted on a physical downlink control channel (PDCCH); and transmitting a first radio signal in a third time window in a third subband if successfully receiving the second signaling in the second time window in the second subband, otherwise, dropping transmission of the first radio signal in the third time window in the third subband, wherein a start time of the third time window is not earlier than an end time of the second time window, wherein the first signaling comprises first-type scheduling information of the first radio signal and indicates a time interval between the third time window and the second time window.

2. The method of claim 1, wherein one of a) the first subband completely overlaps with the second subband, b) the first subband completely overlaps with the third subband, or c) the first subband and the third subband are orthogonal to each other.

3. The method of claim 1, wherein the first subband completely overlaps with the second subband, the third subband is a band associated with the first subband for uplink transmission, and the first subband is a band associated with the third subband for downlink transmission.

4. The method of claim 1, wherein the first subband comprises a carrier or a bandwidth part (BWP) in a carrier, the second subband comprises a carrier or a BWP in a carrier, and the third subband comprises a carrier or a BWP in a carrier.

5. The method of claim 1, wherein the time interval between the third time window and the second time window is a time interval between a start time of the third time window and an end time of the second time window.

6. A method applied to a base station for wireless communication, the method comprising:

transmitting a first signaling in a first time window in a first subband, wherein the first signaling is configured to indicate a first antenna port group, one antenna port group comprises a positive integer number of antenna port(s), and the first signaling is configured to indicate a first index;

transmitting a second signaling in a second time window in a second subband, or dropping transmission of the second signaling in the second time window in the second subband, wherein the second signaling comprises downlink control information (DCI), the second signaling is configured to indicate a first port group set that comprises a positive integer number of antenna port group(s), the second signaling is configured to indicate M index(es) where M is greater than or equal to 1, the first index is one of the M index(es), and the second signaling is transmitted on a physical downlink control channel (PDCCH); and receiving a first radio signal in a third time window in a third subband if transmitting the second signaling in the second time window in the second subband, otherwise, dropping reception of the first radio signal in the third time window in the third subband, wherein a start time of the third time window is not earlier than an end time of the second time window, wherein the first signaling comprises first-type scheduling information of the first radio signal and indicates a time interval between the third time window and the second time window.

7. The method of claim 6, wherein one of a) the first subband completely overlaps with the second subband, b) the first subband completely overlaps with the third subband, or c) the first subband and the third subband are orthogonal to each other.

8. The method of claim 6, wherein the first subband completely overlaps with the second subband, the third subband is a band associated with the first subband for uplink transmission, and the first subband is a band associated with the third subband for downlink transmission.

9. The method of claim 6, wherein the first subband comprises a carrier or a bandwidth part (BWP) in a carrier, the second subband comprises a carrier or a BWP in a carrier, and the third subband comprises a carrier or a BWP in a carrier.

10. The method of claim 6, wherein the time interval between the third time window and the second time window is a time interval between a start time of the third time window and an end time of the second time window.

11. A user equipment (UE) for wireless communications, comprising:

a first receiver configured to receive a first signaling in a first time window in a first subband, wherein the first signaling is configured to indicate a first antenna port group, one antenna port group comprises a positive integer number of antenna port(s), and the first signaling is configured to indicate a first index;

a second receiver configured to monitor a second signaling in a second time window in a second subband, wherein the second signaling comprises downlink control information (DCI), the second signaling is configured to indicate a first port group set that comprises a positive integer number of antenna port group(s), the second signaling is configured to indicate M index(es) where M is greater than or equal to 1, the first index is one of the M index(es), and the second signaling is transmitted on a physical downlink control channel (PDCCH); and a first processor configured to, if successfully receiving the second signaling in the second time window in the second subband, transmitting a first radio signal in a third time window in a third subband, otherwise dropping transmission of the first radio signal in the third time window in the third subband, wherein a start time of the third time window is not earlier than an end time of the second time window, wherein the first signaling comprises first-type scheduling information of the first radio signal and indicates a time interval between the third time window and the second time window.

12. The UE of claim 11, wherein one of a) the first subband completely overlaps with the second subband, b) the first subband completely overlaps with the third subband, or c) the first subband and the third subband are orthogonal to each other.

13. The UE of claim 11, wherein the first subband completely overlaps with the second subband, the third subband is a band associated with the first subband for uplink transmission, and the first subband is a band associated with the third subband for downlink transmission.

14. The UE of claim 11, wherein the first subband comprises a carrier or a bandwidth parameter (BWP) in a carrier, the second subband comprises a carrier or a BWP in a carrier, and the third subband comprises a carrier or a BWP in a carrier.

15. The UE of claim 11, wherein the time interval between the third time window and the second time window is a time interval between a start time of the third time window and an end time of the second time window.

16. A base station for wireless communication, comprising:
- a first transmitter configured to transmit a first signaling in a first time window in a first subband, wherein the first signaling is configured to indicate a first antenna port group, one antenna port group comprises a positive integer number of antenna port(s), and the first signaling is configured to indicate a first index;
- a second transmitter configured to transmit a second signaling in a second time window in a second subband, or dropping transmission of the second signaling in the second time window in the second subband, wherein the second signaling comprises downlink control information (DCI), the second signaling is configured to indicate a first port group set that comprises a positive integer number of antenna port group(s), the second signaling is configured to indicate M index(es) where M is greater than or equal to 1, the first index is one of the M index(es), and the second signaling is transmitted on a physical downlink control channel (PDCCH); and
- a second processor configured to receive a first radio signal in a third time window in a third subband if transmitting the second signaling in the second time window in the second subband, otherwise, drop reception of the first radio signal in the third time window in the third subband, wherein a start time of the third time window is not earlier than an end time of the second time window,
wherein the first signaling comprises first-type scheduling information of the first radio signal and indicates a time interval between the third time window and the second time window.

17. The base station of claim 16, wherein one of a) the first subband completely overlaps with the second subband, b) the first subband completely overlaps with the third subband, or c) the first subband and the third subband are orthogonal to each other.

18. The base station of claim 16, wherein the first subband completely overlaps with the second subband, the third subband is a band associated with the first subband for uplink transmission, and the first subband is a band associated with the third subband for downlink transmission.

19. The base station of claim 16, wherein the first subband comprises a carrier or a bandwidth part (BWP) in a carrier, the second subband comprises a carrier or a BWP in a carrier, and the third subband comprises a carrier or a BWP in a carrier.

20. The base station of claim 16, wherein the time interval between the third time window and the second time window is a time interval between a start time of the third time window and an end time of the second time window.

* * * * *

UNITED STATES PATENT AND TRADEMARK OFFICE
CERTIFICATE OF CORRECTION

| | |
|---|---|
| PATENT NO. | : 11,792,787 B2 |
| APPLICATION NO. | : 17/671598 |
| DATED | : October 17, 2023 |
| INVENTOR(S) | : Keying Wu and Xiaobo Zhang |

It is certified that error appears in the above-identified patent and that said Letters Patent is hereby corrected as shown below:

On the Title Page

(71) Applicant: "Honor Device Co., Ltd., Guangdong (CN)" should read "Honor Device Co., Ltd., Shenzhen (CN)"

(72) Inventors: "Keying Wu, Guangdong (CN)" should read "Keying Wu, Shenzhen (CN)"

(72) Inventors: "Xiaobo Zhang, Guangdong (CN)" should read "Xiaobo Zhang, Shenzhen (CN)"

Signed and Sealed this
Nineteenth Day of December, 2023

Katherine Kelly Vidal
*Director of the United States Patent and Trademark Office*